United States Patent
Uetsuji et al.

(10) Patent No.: US 9,396,543 B2
(45) Date of Patent: Jul. 19, 2016

(54) INFORMATION PROCESSING APPARATUS FOR WATCHING, INFORMATION PROCESSING METHOD AND NON-TRANSITORY RECORDING MEDIUM RECORDING PROGRAM

(71) Applicant: NK WORKS CO., LTD., Wakayama-shi, Wakayama (JP)

(72) Inventors: Masayoshi Uetsuji, Wakayama (JP); Takeshi Murai, Wakayama (JP); Shuichi Matsumoto, Wakayama (JP)

(73) Assignee: NORITSU PRECISION CO., LTD., Wakayama-shi (JP)

( * ) Notice: Subject to any disclaimer, the term of this patent is extended or adjusted under 35 U.S.C. 154(b) by 64 days.

(21) Appl. No.: 14/295,426

(22) Filed: Jun. 4, 2014

(65) Prior Publication Data
US 2014/0363089 A1 Dec. 11, 2014

(30) Foreign Application Priority Data
Jun. 10, 2013 (JP) .................. 2013-121503

(51) Int. Cl.
*G06K 9/48* (2006.01)
*G06T 7/00* (2006.01)
*G06K 9/00* (2006.01)

(52) U.S. Cl.
CPC .......... *G06T 7/0051* (2013.01); *G06K 9/00335* (2013.01); *G06T 2207/10016* (2013.01); *G06T 2207/10028* (2013.01); *G06T 2207/20104* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 7,098,940 B2* | 8/2006 | Suzuki | .................. | H04N 7/188 348/143 |
| 7,987,069 B2* | 7/2011 | Rodgers | ............... | A61B 5/1115 340/573.1 |
| 8,213,711 B2* | 7/2012 | Tam | ...................... | G06T 7/0051 382/162 |
| 8,675,059 B2* | 3/2014 | Johnson | ............. | G06K 9/00369 340/541 |
| 2005/0213793 A1* | 9/2005 | Oya | .................... | G06K 9/00711 382/103 |
| 2011/0288417 A1* | 11/2011 | Pinter | .................. | A61B 5/0033 600/473 |
| 2013/0127620 A1* | 5/2013 | Siebers | ................. | G08B 21/02 340/573.1 |
| 2013/0184592 A1* | 7/2013 | Venetianer | ............... | H04N 7/18 600/476 |
| 2014/0096091 A1* | 4/2014 | Reid | ................... | G06F 19/3462 715/863 |

FOREIGN PATENT DOCUMENTS

| | | |
|---|---|---|
| JP | 2002-230533 A | 8/2002 |
| JP | 2011-5171 A | 1/2011 |

* cited by examiner

*Primary Examiner* — Daniel Mariam
(74) *Attorney, Agent, or Firm* — Westerman, Hattori, Daniels & Adrian, LLP

(57) ABSTRACT

An information processing apparatus includes an image acquiring unit to acquire captured image of a watching target person and a target object as a reference for a behavior, the captured image containing depth information indicating depths per pixel, a foreground area extracting unit to extract a foreground area on the basis of a difference between a foreground image and the captured image, the foreground image being set to contain a depth of the foreground and a behavior presuming unit to presume the behavior about the target object by determining whether a positional relationship between the foreground area and the target object area satisfies a predetermined condition or not on the basis of referring to the depths of the pixels in the foreground area based on the depth information, the condition being set on the assumption that the extracted foreground area is related to the behavior.

13 Claims, 11 Drawing Sheets

INFORMATION PROCESSING APPARATUS FOR WATCHING, INFORMATION PROCESSING METHOD AND NON-TRANSITORY RECORDING MEDIUM RECORDING PROGRAM

FIELD

The present invention relates to an information processing apparatus for watching, an information processing method and a non-transitory recording medium recorded with a program.

BACKGROUND

A technology (Japanese Patent Application Laid-Open Publication No. 2002-230533) exists, which determines a get-into-bed event by detecting a movement of a human body from a floor area into a bed area in a way that passes through a frame border of an image captured from upward indoors to downward indoors, and determines a leaving-bed event by detecting a movement of the human body from the bed area down to the floor area.

Another technology (Japanese Patent Application Laid-Open Publication No. 2011-005171) exists, which sets a watching area for detecting that a patient lying down on the bed conducts a behavior of getting up from the bed as an area immediately above the bed, which covers the patient sleeping in the bed, and determines that the patient conducts a behavior of getting up from the bed if a variation value representing a size of an image area of a deemed-to-be patient that occupies a watching area of a captured image covering the watching area from a crosswise direction of the bed, is less than an initial value representing a size of the image area of the deemed-to-be patient that occupies the watching area of a captured image obtained from a camera in a state of the patient lying down on the bed.

In recent years, there has been an annually increasing tendency of accidents that watching target persons such as inpatients, care facility tenants and care receivers fall down or come down from beds and of accidents caused by wandering of dementia patients. A watching system is, as exemplified in the document described above, developed as a method of preventing those accidents. The watching system is configured to detect behaviors of the watching target person such as a get-up state, a sitting-on-bed-edge state and a leaving-bed state by capturing an image of the watching target person with a camera installed indoors and analyzing the captured image. This type of watching system presumes the behavior of the watching target person on the basis of an analyzed result of two-dimensional image captured by the camera. Therefore, this leads to acquisition of a result of the behavioral presumption not suited to a state of the watching target person in a space in reality (which will hereinafter be termed a "real space") as the case may be.

SUMMARY

An information processing apparatus according to one aspect of the present invention includes: an image acquiring unit to acquire captured image given by capturing an image of a watching target person whose behavior is watched and an image of a target object serving as a reference for a behavior of the watching target person, the captured image containing depth information indicating depths obtained on a pixel-by-pixel basis within the captured image, a foreground area extracting unit to extract a foreground area of the captured image on the basis of a difference between a foreground image and the captured image, the foreground image being set to contain a depth of the foreground as the foreground of the captured image, and a behavior presuming unit to presume the behavior of the watching target person with respect to the target object by determining whether a positional relationship between the foreground area and the area of the target object in a real space satisfies a predetermined condition or not on the basis of referring to the depths of the pixels within the foreground area on the basis of the depth information, the predetermined condition being set on the assumption that the extracted foreground area is related to the behavior of the watching target person.

According to the configuration described above, there are obtained the depths of the pixels of the captured image given by capturing the image of the watching target person and the image of the target object serving as the reference for the behavior of the watching target person. The depths of the pixels represent depths of objects. Hence, it is feasible to estimate the positional relationship between the objects including the watching target person and the target object in the real space by making use of the depths thereof.

Such being the case, in the configuration described above, at first, the foreground area of the captured image is extracted on the basis of the difference between the background image and the captured image. This background image is set to contain a depth of the background as the background of the captured image. The foreground area extracted based on the difference between the captured image and the background image is an area with a variation occurring from the background image. Therefore, when the watching target person moves, the foreground area to be extracted is assumed to contain leastwise the area with the variation occurring due to the movement of the watching target person. The information processing apparatus according to the configuration described above presumes the behavior of the watching target person by making use of the foreground area such as this.

To be specific, the information processing apparatus according to the configuration described above refers to the depths of the images in the foreground area extracted based on the depth information contained in the captured image. The information processing apparatus determines whether the positional relationship between the foreground area and the area of the target object satisfies the condition or not. In this case, the condition is set on the assumption that the foreground area is related to the behavior of the watching target person. It is to be noted that the watching target person connotes a target person whose behavior is watched by the present invention (the information processing apparatus) and is exemplified by an inpatient, a care facility tenant, a care receiver, etc.

Hence, according to the configuration described above, the behavior of the watching target person is presumed in accordance with the positional relationship between the watching target person and the target object in the real space by using the depth information indicating the depths of the objects. It is therefore possible to presume the behavior suited to a state of the watching target person in the real space.

Further, by way of another mode of the information processing apparatus according to one aspect, the behavior presuming unit may determine whether the positional relationship between the foreground area and the area of the target object satisfies the condition or not on the basis of a field, included in a detection area set for the target object, of the extracted foreground area. According to the configuration described above, the foreground area set as a processing target for presuming the behavior of the watching target person can be confined by the detection area. It is therefore feasible to adjust the range in the real space where the behavior of the watching target person is presumed.

Moreover, by way of still another mode of the information processing apparatus according to one aspect, the information processing apparatus may further include a detection area setting unit to accept designation of an area covering an existence of the target object within the captured image, to acquire the depth of the target object existing in the designated area from the captured image, to specify a position of the target object in the real space on the basis of the acquired depth of the target object and to set the detection area corresponding to the specified position of the target object in the real space. The configuration described above enables a user to designate the area of the target object serving as the reference in the detection area in which the target area for presuming the behavior of the watching target person is set. Hence, according to the configuration described above, it is possible to provide a watching system that flexibly corresponds to a direction of a camera, a state of arrangement of the target object, etc.

Moreover, by way of yet another mode of the information processing apparatus according to one aspect, the detection area setting unit may associates a length of the target object in the captured image with a length of the target object in the real space, the latter length being set as a predetermined value, then may calculates the depth of the target object and thus may acquire the depth of the target object from the captured image without referring to the depth information contained in the captured image.

The depth largely varies at a border of the object as the case may be. Consequently, the user happens to designate the range of the target object with a deviation outward from the boarder of the target object. In this case, if acquiring the depth of the target object from the depth information contained in the captured image, such a situation can occur that the depth largely different from an originally estimated depth of the target object is acquired. According to the configuration described above, the depth of the target object is acquired without depending on the depth information contained in the captured image. Hence, such a situation can be avoided. It is also feasible to set the detection area in the real space with high accuracy on the basis of the target object.

Furthermore, by way of still yet another mode of the information processing apparatus according to one aspect, when the watching target person conducts the behavior with respect to the target object, a range of a planar dimension of an area in which to obtain the depth of a predetermined region of the watching target person existing in the detection area in the real space, may be set as the condition for presuming the behavior of the watching target person. Then, the behavior presuming unit may estimate a region area corresponding to the predetermined region of the watching target person in the field, included in the detection area, of the foreground area, may calculate planar dimensions on a pixel-by-pixel basis in the real space in accordance with depths on the pixel-by-pixel basis in the region area indicated by the depth information, and may presume the behavior of the watching target person with respect to the target object on the basis of determining whether a total sum of the planar dimensions calculated on the pixel-by-pixel basis in the region area is included in the planar dimension range set as the condition or not.

According to the configuration described above, in the field, included in the detection area, of the foreground area, the region area corresponding to the predetermined region of the watching target person is estimated. Then, the behavior of the watching target person is presumed corresponding to the planar dimension of the region area. Note that the area, in which the depth of the predetermined region of the watching target person is acquired, is an image capturing target surface of the predetermined region. Hence, the planar dimension of the region area corresponds to a planar dimension of the image capturing target surface of the predetermined region.

Herein, as the object gets farther away from a device for capturing the captured image, the image of the object in the captured image becomes smaller. Therefore, if the number of pixels (pixel count) in the region area is associated directly with the planar dimension of the region area, it follows that the planar dimension of the region area not matching with a state of the real space is acquired due to the image being affected by a far-and-near distance of the object. To cope with this problem, in the configuration described above, there is calculated the planar dimension on the pixel-by-pixel basis in the real space is calculated corresponding to the depths on the pixel-by-pixel basis in the region area. Then, the total sum of the planar dimensions calculated on the pixel-by-pixel basis in the region area is obtained as the planar dimension of the region area. With this contrivance, it is feasible to obtain the planar dimension of the region area serving as the reference for presuming the behavior of the watching target person without being affected by the far-and-near distance of the object. In the configuration described above, the behavior of the watching target person can be therefore presumed without being affected by the far-and-near distance of the object.

Moreover, by way of yet another mode of the information processing apparatus according to one aspect, when the watching target person conducts the behavior with respect to the target object, a range of a dispersion indicating a spread degree of the area in which to obtain the depth with respect to the predetermined region of the watching target person existing in the detection area in the real space, may be further set as the condition for presuming the behavior of the watching target person. Then, the behavior presuming unit may calculate the dispersion indicating the spread degree of the region area to be estimated in the real space, and may presume the behavior of the watching target person with respect to the target object by further determining whether the calculated dispersion is included in the range set as the condition or not.

If using only the planar dimension of the predetermined region area of the watching target person, there is a possibility of mis-recognizing the region of the watching target person. For example, when capturing the image of the watching target person in such a state that the planar dimension of the head area is the same as a planar dimension of an arm area, there is a possibility that the arm is mis-recognized as the head. Such being the case, in the configuration described above, a focus is put on a point that each of the regions of the body has a different degree of spread in the real space. The mis-recognition described above is prevented by making use of a dispersion indicating the degree of spread of the region area in the real space.

Further, by way of an additional mode of the information processing apparatus according to one aspect, the target object may be a bed, and the detection area may be set above the bed to include at least a head of the watching target person when the watching target person behaves on the bed. Then, the range of the planar dimension and the range of the dispersion each becoming the condition for presuming the behavior of the watching target person may be set in a way that targets on at least the head of the watching target person. Further, the behavior presuming unit may estimate a head area corresponding to the head of the watching target person in the field, included in the detection area, of the foreground area, may then calculate a total sum of planar dimensions and a dispersion about the estimated head area, and may presume the behavior of the watching target person with respect to the bed by determining whether or not the calculated total sum of the planar dimensions and the calculated dispersion about the head area are included in the ranges each set in a way that targets on the head. According to the configuration described above, the behavior of the watching target person with respect to the bed can be presumed. The present invention can be therefore utilized as an apparatus for watching the inpatient, the care facility tenant, the care receiver, etc in the hospital, the care facility and so on.

Moreover, by way of another additional mode of the information processing apparatus according to one aspect, the range of the planar dimension and the range of the dispersion, each becoming the condition for presuming the behavior of the watching target person, may further be set in a way that targets on a shoulder of the watching target person. Then, the behavior presuming unit may further estimate a shoulder area corresponding to the shoulder of the watching target person from an area adjacent to the head area in the field, included in the detection area, of the foreground area, may then calculate the total sum of the planar dimensions and the dispersion about the estimated shoulder area, and may presume the behavior of the watching target person with respect to the bed by determining whether or not the calculated total sum of the planar dimensions and the calculated dispersion about the shoulder area are included in the ranges each set in a way that targets on the shoulder. According to the configuration described above, the focus is put on not only the head but also the shoulder. The accuracy of presuming the behavior of the watching target person can be therefore enhanced.

Further, by way of still another additional mode of the information processing apparatus according to one aspect, the behavior presuming unit may presume at least any one of behaviors such as a get-up state on the bed, a sitting-on-bed-edge state, a body-moving-over-fence state from the bed, a come-down state from the bed and a leaving-bed state from the bed of the watching target person, the presumption being made based on a positional relationship between the head area, the shoulder area and the bed in the real space. Note that the sitting-on-bed-edge state represents a state where the watching target person sits on the edge of the bed. According to the configuration described above, it is possible to presume at least any one of a get-up state on the bed, the sitting-on-bed-edge state, a body-moving-over-fence state (over-fence state), a come-down state and a leaving-bed state of the watching target person. It is therefore feasible to provide a watching system further suited to the apparatus for watching the inpatient, the care facility tenant, the care receiver, etc in the hospital, the care facility and so on.

Moreover, by way of yet another additional mode of the information processing apparatus according to one aspect, the behavior presuming unit, when presuming the behavior of the watching target person by use of the captured image acquired after presuming at least any one of the behaviors such as the get-up state on the bed, the sitting-on-bed-edge state, the body-moving-over-fence state from the bed, the come-down state from the bed and the leaving-bed state from the bed of the watching target person, may change the range of the detection area so as to become an area estimated to cover existences of the head and the shoulder of the watching target person, with positions of the head area and the shoulder area serving as references, these positions being given when presuming any one of the behaviors of the watching target person.

As described above, there is a case where the detection area is set above the bed. In this case, the watching target person has a high possibility of moving outward of the detection area after conducting at least any one of the behaviors such as the get-up state, the sitting-on-bed-edge state, the body-moving-over-fence state, the come-down state and the leaving-bed state. Therefore, in the configuration described above, after detecting any one of the behaviors of the watching target person, the detection area is modified corresponding to the position where the watching target person exists. The behavior of the watching target person can be thereby presumed successively after the detection area has been used for detecting the watching target person.

Furthermore, by way of yet another additional mode of the information processing apparatus according to one aspect, a depth sensor to measure the depth on the basis of irradiation of infrared-rays may acquire the depth information contained in the captured image given by capturing the image of the watching target person and the image of the bed.

In the configuration described above, a place for watching the watching target person is a place where the bed of the watching target person is placed. In other words, the watching place is a place where the watching target person sleeps in the bed. Hence, the place for watching the watching target person is dark in many cases. Herein, various types of depth sensors for measuring the depth exist. The configuration described above, however, involves using the depth sensor for measuring the depth on the basis of the irradiation of infrared-rays. Hence, according to the configuration described above, the behavior of the watching target person can be presumed by acquiring the depth of the object without being affected by brightness in the place for watching the watching target person. Note that comparatively low-cost infrared-ray depth sensors can be exemplified by "Kinect" made by Microsoft Corp., "Xtion" made by ASUS Corp. and "CARMINE" made by PrimeSense Corp.

Furthermore, by way of more additional mode of the information processing apparatus according to one aspect, the information processing apparatus may further include a display control unit to display the captured image on a display device, the captured image being formed so that grayscale values of the pixels in the captured image are determined corresponding to the depths of the pixels. Then, the display control unit may display the captured image on the display device by color-differentiating the areas distinguished to be specified areas within the captured image. According to the configuration described above, the specified areas are color-differentiated even in the captured image expressed by the grayscale values corresponding to the depths. This contrivance can make the user easy to grasp the specified areas in the captured image.

Moreover, by way of another more additional mode of the information processing apparatus according to one aspect, the information processing apparatus may further include a notifying unit to notify, when the presumed behavior of the watching target person is a behavior indicating a symptom that the watching target person will encounter with an impending danger, a watcher to watch the watching target person of this symptom.

According to the configuration described above, it is possible to notify the watcher of the symptom that the watching target person will encounter with the impending danger. Further, the watching target person can be also notified of the symptom of encountering with the impending danger. Note that the watcher is the person who watches the behavior of the watching target person and is exemplified by a nurse, care facility staff and a caregiver if the watching target persons are the inpatient, the care facility tenant, the care receiver, etc. Moreover, the notification for informing of the symptom that the watching target person will encounter with the impending danger may be issued in cooperation with equipment installed in a facility such as a nurse call system.

It is to be noted that another mode of the information processing apparatus according to one aspect may be an information processing system realizing the respective configurations described above, may also be an information processing method, may further be a program, and may yet further be a non-transitory storage medium recording a program, which can be read by a computer, other apparatuses and machines. Herein, the recording medium readable by the computer etc is a medium that accumulates the information such as the program electrically, magnetically, mechanically or by chemical action. Moreover, the information processing system may be realized by one or a plurality of information processing apparatuses.

For example, an information processing method according to one aspect of the present invention is an information processing method by which a computer executes: acquiring captured image given by capturing an image of a watching target person whose behavior is watched and an image of a target object serving as a reference for a behavior of the watching target person, the captured image containing depth information indicating depths obtained on a pixel-by-pixel basis within the captured image, extracting a foreground area of the captured image on the basis of a difference between a foreground image and the captured image, the foreground image being set to contain a depth of the foreground as the foreground of the captured image, and presuming the behavior of the watching target person with respect to the target object by determining whether a positional relationship between the foreground area and the area of the target object in a real space satisfies a predetermined condition or not on the basis of referring to the depths of the pixels within the foreground area on the basis of the depth information, the predetermined condition being set on the assumption that the extracted foreground area is related to the behavior of the watching target person.

For instance, a non-transitory recording medium according to one aspect of the present invention is a non-transitory recording medium recording a program to make a computer execute acquiring captured image given by capturing an image of a watching target person whose behavior is watched and an image of a target object serving as a reference for a behavior of the watching target person, the captured image containing depth information indicating depths obtained on a pixel-by-pixel basis within the captured image, extracting a foreground area of the captured image on the basis of a difference between a foreground image and the captured image, the foreground image being set to contain a depth of the foreground as the foreground of the captured image, and presuming the behavior of the watching target person with respect to the target object by determining whether a positional relationship between the foreground area and the area of the target object in a real space satisfies a predetermined condition or not on the basis of referring to the depths of the pixels within the foreground area on the basis of the depth information, the predetermined condition being set on the assumption that the extracted foreground area is related to the behavior of the watching target person.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment (which will hereinafter be also termed "the present embodiment") according to one aspect of the present invention will hereinafter be described based on the drawings. However, the present embodiment, which will hereinafter be explained, is no more than an exemplification of the present invention in every point. As a matter of course, the invention can be improved and modified in a variety of forms without deviating from the scope of the present invention. Namely, on the occasion of carrying out the present invention, a specific configuration corresponding to the embodiment may properly be adopted.

Note that data occurring in the present embodiment are, though described in a natural language, specified more concretely by use of a quasi-language, commands, parameters, a machine language, etc, which are recognizable to a computer.

§1 Example of Applied Situation

Figure 1:
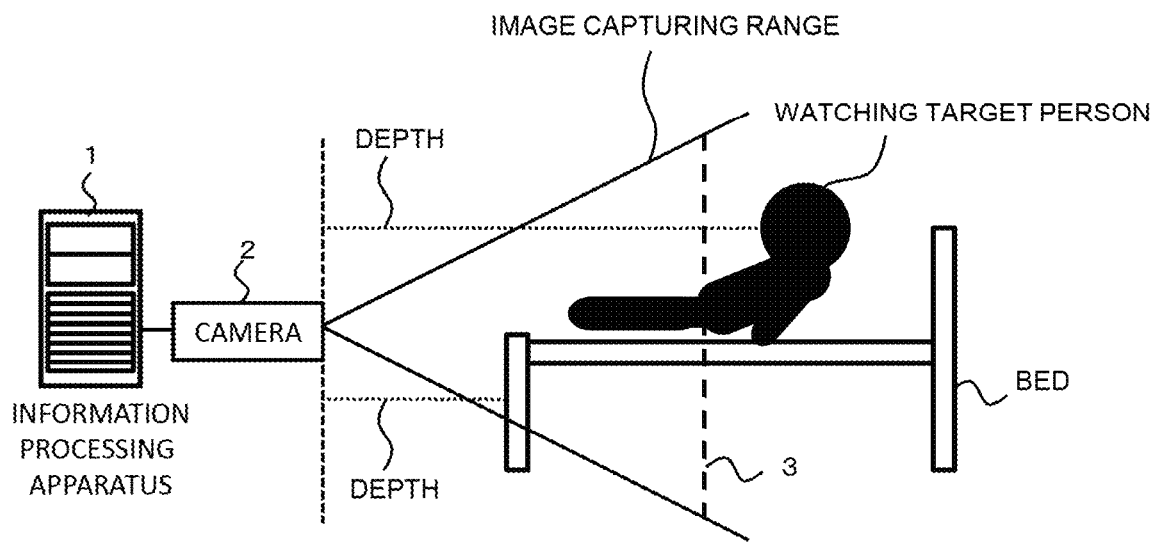
FIG. 1 is a view illustrating one example of a situation to which the present invention is applied.

At first, a situation to which the present invention is applied will be described with reference to FIG. 1. FIG. 1 illustrates one example of the situation to which the present invention is applied. The present embodiment assumes a situation of watching a behavior of an inpatient in a medical treatment facility or a tenant in a nursing facility as a watching target person. An image of the watching target person is captured by a camera 2 installed on a front side of a bed in a longitudinal direction, thus watching a behavior thereof.

The camera 2 captures the image of the watching target person whose behaviors are watched and an image of a target object serving as a reference of the behavior of the watching target person. The target object serving as the reference for the behavior of the watching target person may be properly selected corresponding to the embodiment. The applied situation illustrated in FIG. 1 assumes that the behavior of the inpatient in a hospital room or the behavior of the tenant in the nursing facility is watched. Hence, a bed is exemplified as the target object serving as the reference for the behavior of the watching target person.

Herein, the camera 2 used in the present embodiment will be described. The camera 2 according to the embodiment may include a depth sensor. The depth sensor measures a depth of an object so that the depth corresponding to respective pixels within the capture image can be acquired. A type and a measurement method of the depth sensor may be properly selected corresponding to the embodiment. It is, however, preferable to use the depth sensor configured to measure the depth on the basis of irradiation of infrared-rays in order to acquire the depth without being affected by brightness of an image capturing place.

Further, the camera 2 may also be a stereo camera enabled to specify the depth of the object within an image capturing range. The stereo camera captures the images of the object within the image capturing range from a plurality of different directions and is therefore capable of recording the depth of the object. The camera 2, if capable of specifying the depth of the object within the image capturing range, may be replaced by the depth sensor as a single body but may not be limited in particular.

In the present embodiment, the camera 2 captures the image of the watching target person and the image of the object (bed), and then acquires the captured image 3. The captured image 3, as illustrated in FIG. 1, contains depth information indicating a depth obtained on a pixel-by-pixel basis. It is sufficient that the captured image 3 is data indicating the depths of the objects within the image capturing range. For example, the captured image 3 may also be such data (e.g., a depth map) that the depths of the objects within the image capturing range are distributed two-dimensionally. Further, the captured image 3 may contain RGB image together with the depth information. Moreover, the captured image 3 may also be moving image and may further be still image.

Figure 2:
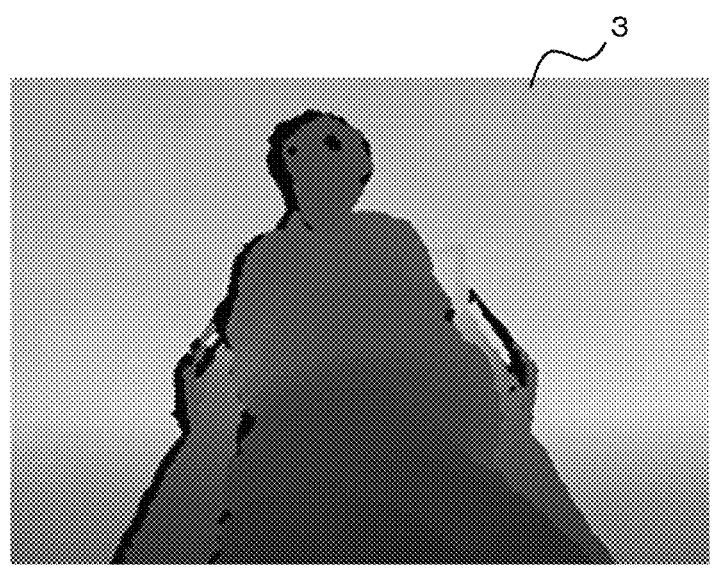
FIG. 2 is a view illustrating one example of captured image in which grayscale values of pixels are determined corresponding to depths of the pixels.

FIG. 2 illustrates one example of the captured image 3. The captured image 3 illustrated in FIG. 2 is an image in which grayscale values of the pixels are determined corresponding to the depths of the pixels. A more blackish pixel implies being closer to the camera 2. By contrast, a more whitish pixel implies being farther from the camera 2. The depth information enables a position of the object to be specified in the real space (three-dimensional space) within the image capturing range. More specifically, the depth of the object is obtained with respect to a surface of the object. Therefore, the position of the surface of the object being projected on the camera 2 in the real space can be specified by using the depth information contained in the captured image 3. Note that the captured image 3 captured by the camera 2 are transmitted an information processing apparatus 1.

The information processing apparatus 1 according to the present embodiment acquires the captured image 3 from the camera 2. The camera 2 captures the image of the watching target person and the image of the target object (bed). The captured image 3 contains the depth information indicating the depth obtained on the pixel-by-pixel basis within the captured image 3. Then, the information processing apparatus 1 extracts a foreground image of the captured image 3. The foreground image is extracted from a difference between the captured image 3 and a background image of a background of the captured image 3, the background image being set to include a depth of this background. Further, the information processing apparatus 1 refers to the depths of the pixels within a foreground area on the basis of the depth information. The information processing apparatus 1 determines, based on these depths, whether a positional relationship between the foreground area and an area of the target object (bed) in the real space satisfies a condition or not, the condition being set on the premise that the extracted foreground area is related to the behavior of the watching target person. The information processing apparatus 1 thus presumes the behavior of the watching target person with respect to the target object (bed) on the basis of the determining result.

Note that the behavior of the watching target person with respect to the target object is defined as a behavior of the watching target person in relation to the target object in the behaviors of the watching target person, and may be properly selected corresponding to the embodiment. In the present embodiment, the target object serving as the reference for the behavior of the watching target person is the bed for the watching target person to sleep. This being the case, the information processing apparatus 1 according to the present embodiment presumes, as the behavior of the watching target person with respect to the bed, at least any one of following behaviors. These behaviors (states) are a get-up state on the bed, a sitting-on-bed-edge state, an over-bed-fence state (the body moving over the bed fence), a come-down state from the bed and a leaving-bed state. With this contrivance, the information processing apparatus 1 can be utilized as an apparatus for watching the inpatient, the facility tenant, the care receiver, etc in the hospital, the nursing facility and so on. An in-depth description thereof will be made later on.

Thus, according to the present embodiment, the behavior of the watching target person can be presumed by making use of the depth information representing how much deep the target exists from the camera. Therefore, according to the present embodiment, the depth information indicating the depth of the object is used, and the behavior of the watching target person is presumed in accordance with the positional relationship between the watching target person and the target object in the real space. Hence, it is feasible to presume the behavior suited to the state of the watching target person in the real space.

Figure 3:
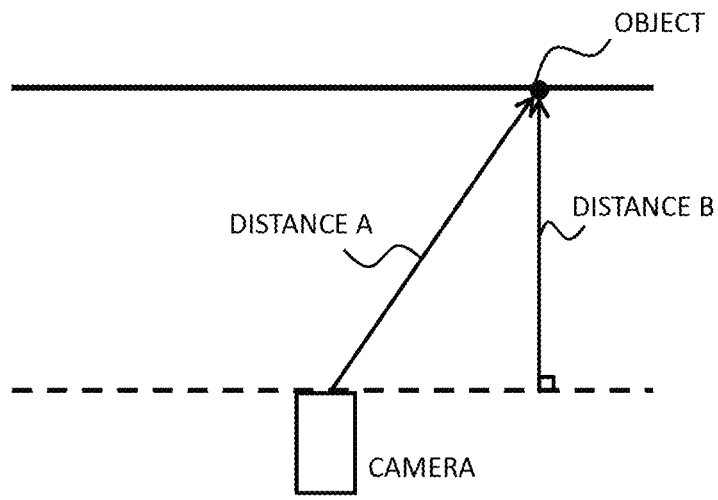
FIG. 3 is a diagram illustrating depths according to an embodiment.

Herein, the "depth" according to the present embodiment will be described with reference to FIG. 3. FIG. 3 illustrates one example of a distance that can be treated as the depth according to the present embodiment. The "depth" expresses the depth of the object. As illustrated in FIG. 3, the depth of the object may be expressed by, e.g., a distance A of a straight line extending between the camera and the object. The depth of the object may also be expressed by a distance B of a vertical line extending downward from a horizontal axis with respect to the object of the camera. Namely, the depth according to the present embodiment may be the distance A and may also be the distance B. The present embodiment is to treat the distance B as the depth. The distance A and the distance B are, however, exchangeable with each other by use of, e.g., the Pythagorean Theorem etc. A description from now onward can be therefore applied directly to the distance A.

§2 Example of Configuration

<Example of Hardware Configuration>

Figure 4:
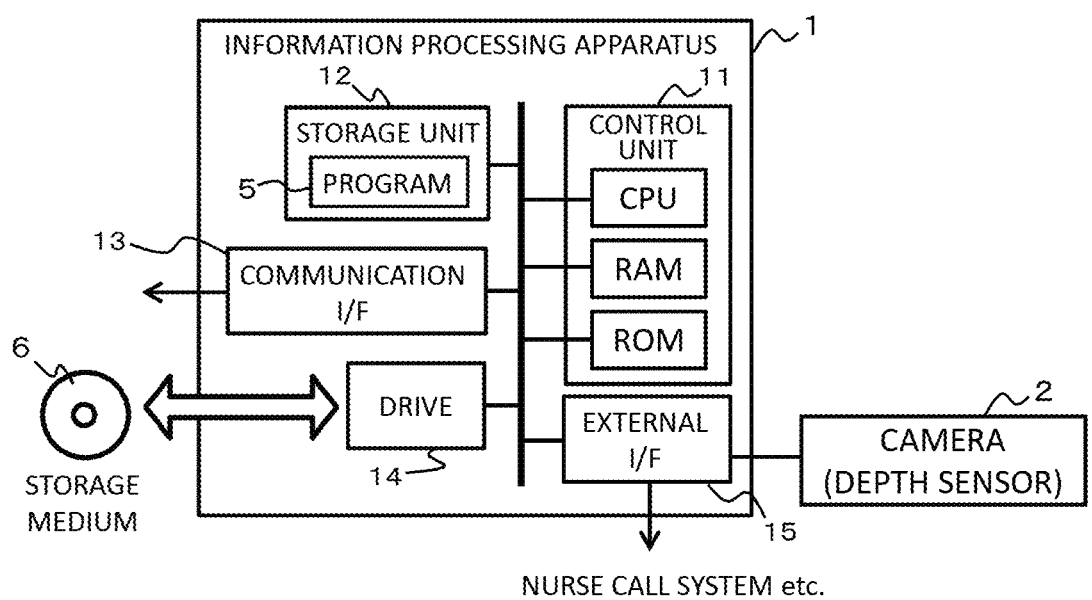
FIG. 4 is a diagram illustrating a hardware configuration of an information processing apparatus according to the embodiment.

A hardware configuration of the information processing apparatus 1 according to the present embodiment will be described with reference to FIG. 4. FIG. 4 illustrates a hardware configuration of the information processing apparatus according to the present embodiment. The information processing apparatus 1 is a computer including: a control unit 11 containing a CPU, a RAM (Random Access Memory) and a ROM (Read Only Memory); a storage unit 12 storing a program 5 etc executed by the control unit 11; a communication interface 13 for performing communications via a network; a drive 14 for reading a program stored on a storage medium 6; and an external interface 15 for establishing a connection with an external device, which are all electrically connected to each other.

Note that as for the specific hardware configuration of the information processing apparatus 1, the components thereof can be properly omitted, replaced and added corresponding to the embodiment. For instance, the control unit 11 may include a plurality of processors. Furthermore, the information processing apparatus 1 may be equipped with output devices such as a display and input devices for inputting such as a mouse and a keyboard. Note that the communication interface and the external interface are abbreviated to the "communication I/F" and the "external I/F" respectively in FIG. 4.

Furthermore, the information processing apparatus 1 may include a plurality of external interfaces 15 and may be connected to external devices through these interfaces 15. In the present embodiment, the information processing apparatus 1 may be connected to the camera 2 including the depth sensor via the external I/F 15. Moreover, the information processing apparatus 1 is connected via the external I/F 15 to equipment installed in a facility such as a nurse call system. Through this connection, notification for informing of a symptom that the watching target person will encounter with an impending danger may be issued in cooperation with the equipment.

Moreover, the program 5 is a program for making the information processing apparatus 1 execute steps contained in the operation that will be explained later on, and corresponds to a "program" according to the present invention. Moreover, the program 5 may be recorded on the storage medium 6. The storage medium 6 is a non-transitory medium that accumulates information such as the program electrically, magnetically, optically, mechanically or by chemical action so that the computer, other apparatus and machines, etc can read the information such as the recorded program. The storage medium 6 corresponds to a "non-transitory storage medium" according to the present invention. Note that FIG. 4 illustrates a disk type storage medium such as a CD (Compact Disk) and a DVD (Digital Versatile Disk) by way of one example of the storage medium 6. It does not, however, mean that the type of the storage medium 6 is limited to the disk type, and other types excluding the disk type may be available. The storage medium other than the disk type can be exemplified by a semiconductor memory such as a flash memory.

Further, the information processing apparatus 1 may involve using, in addition to, e.g., an apparatus designed for an exclusive use for a service to be provided, general-purpose apparatuses such as a PC (Personal Computer) and a tablet terminal. Further, the information processing apparatus 1 may be implemented by one or a plurality of computers.

<Example of Functional Configuration>

Figure 5:
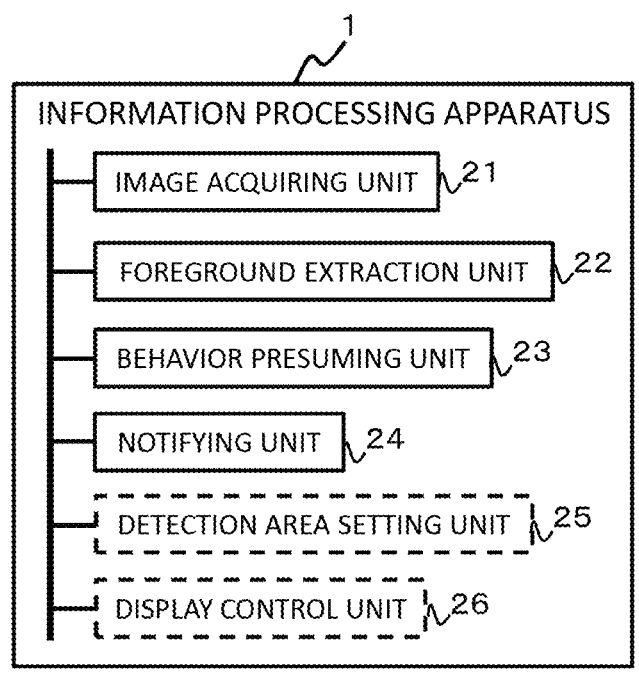
FIG. 5 is a diagram illustrating a functional configuration according to the embodiment.

Next, a functional configuration of the information processing apparatus 1 will be described by referring to FIG. 5. FIG. 5 illustrates a functional configuration of the information processing apparatus 1 according to the present embodiment. The CPU provided in the information processing apparatus 1 according to the present embodiment deploys the program 5 on the RAM, which is stored in the storage unit 12. Then, the CPU interprets and executes the program 5 deployed on the RAM, thereby controlling the respective components. Through this operation, the information processing apparatus 1 according to the present embodiment functions as the computer including an image acquiring unit 21, a foreground extraction unit 22, a behavior presuming unit 23 and a notifying unit 24.

The image acquiring unit 21 acquires the captured image 3. The captured image 3 is obtained by capturing the image of the watching target person whose behavior is watched and the image of the target object serving as the reference of the behavior of the watching target person. The captured image 3 contains the depth information indicating the depths obtained on the pixel-by-pixel basis within the captured image 3 in the present embodiment, the bed for the watching target person to sleep is exemplified as the target object serving as the reference for the behavior of the watching target person.

The foreground extraction unit 22 extracts the foreground image of the captured image 3. The foreground image is extracted from the difference between the captured image 3 and the background image of the background of the captured image 3, the background image being set to include the depth of this background. The background image will be described later on. The foreground area defined as the difference between the captured image 3 and the background image is an area in which a variation occurs from the background image in the captured image 3. Therefore, the foreground area to be extracted contains at least the area where the variation occurs due to a movement of the watching target person.

The behavior presuming unit 23 presumes the behavior of the watching target person by making use of the foreground area such as this. Namely, the behavior presuming unit 23 refers to the depths of the pixels within the foreground area on the basis of the depth information. Then, the behavior presuming unit 23 determines, based on these depths, whether or not the positional relationship between the foreground area and the area of the target object in the real space satisfies the condition being set on the premise that the extracted foreground area is related to the behavior of the watching target person. The behavior presuming unit 23 thus presumes the behavior of the watching target person with respect to the target object on the basis of the determining result.

Herein, the foreground area has a possibility of including an area where a variation occurs irrespective of the behavior of the watching target person. This being the case, the behavior presuming unit 23 sets, as a detection area in the real space, the area where a variation derived from the watching target person is assumed to occur on the basis of a position of the target object and a presumption target behavior. Then, the behavior presuming unit 23 may ignore the area where the variation occurs irrespective of the behavior of the watching target person. Namely, the behavior presuming unit 23 may determine whether the positional relationship between the foreground area and the area of the target object satisfies the condition or not. In this case, the determination is made based on a field, included in the detection area set for the target object, of the extracted foreground area.

The detection area such as this may be preset and may also be set by a user. The user sets the detection area, in which case the information processing apparatus 1 may be equipped with, e.g., a detection area setting unit 25. The detection area setting unit 25 accepts designation of the area where the target object exists within the captured image 3. The detection area setting unit 25 acquires the depth of the target object existing in the designated area from the captured image 3. The detection area setting unit 25 specifies, based on the acquired depth of the target object, the position of the target object within the real space. The detection area setting unit 25 thus sets the detection area corresponding to the specified position of the target object within the real space.

Note that the depth largely varies at a border of the object as the case may be. For this reason, if the user designates the range of the target object with a deviation outward from the border of the target object and when acquiring the depth of the target object from the depth information contained in the captured image 3, such a situation can occur as to obtain a depth that is largely different from an originally estimated depth of the target object. To cope with this situation, the detection area setting unit 25 may acquire the depth of the target object from the captured image 3 by calculating the depth of the target object in a way that associates a length of the target object within the captured image 3 with a length of the target object within the real space, this latter length being set as a predetermined value, without referring to the depth information contained in the captured image 3.

Further, the condition for presuming the behavior of the watching target person may be properly selected corresponding to the embodiment. For example, when the watching target person takes a behavior with respect to the target object, a range of a planar dimension of the area in which to obtain a depth about a predetermined region of the watching target person existing in the detection area within the real space, may be set as the condition for presuming the behavior of the watching target person. As described above, the depth of the object is obtained with respect to the surface of the object. Therefore, the condition for presuming the behavior of the watching target person is set about the planar dimension of the area in which to obtain the depth about the predetermined region of the watching target person.

In this case, in the field, included in the detection area, of the foreground area, the behavior presuming unit 23 estimates a region area corresponding to the predetermined region of the watching target person. The behavior presuming unit 23 calculates the planar dimensions in the real space on the pixel-by-pixel basis in a way that corresponds to the depth per pixel in this region area indicated by the depth information. Then, the behavior presuming unit 23 determines whether or not a total sum of the planar dimensions calculated on the pixel-by-pixel basis within the region area is embraced by a planar dimension range set as the condition. Thus, the behavior presuming unit 23 may presume the behavior of the watching target person with respect to the target object on the basis of the determining result. An in-depth description thereof will be made later on.

Note that the condition for presuming the behavior of the watching target person is set by making use of the planar dimension of the area in which to obtain the depth about the predetermined region of the watching target person. In this case, the predetermined region is a body region of the watching target person in relation to the presumption target behavior. Namely, in this instance, it follows that the behavior presuming unit 23 presumes the behavior of the watching target person on the basis of a point that the body region of the watching target person in relation to the presumption target behavior exists in the detection area.

There is, however, a case in which a region other than the predetermined region in relation to the presumption target behavior is projected within the captured image 3 so as to have the same planar dimension as the predetermined region. In this case, the behavior presuming unit 23 mis-recognizes another region projected with the same planar dimension as the predetermined region to be the predetermined region, resulting in a possibility of mis-recognizing the behavior of the watching target person. Such being the case, the information processing apparatus 1 according to the present embodiment puts a focus on a point that a spread degree in the real space is different on a per region of the body, and may further set a condition enabling the mis-recognition to be prevented.

For example, when the watching target person takes the behavior with respect to the target object, a dispersion range may be further set as a condition for presuming the behavior of the watching target person. Herein, the dispersion range indicates the spread degree of the area in which to obtain the depth with respect to the predetermined region of the watching target person existing in the detection area in the real space. In this case, the behavior presuming unit 23 calculates a dispersion indicating the spread degree of the estimated region area in the real space. Then, the behavior presuming unit 23 determines whether the calculated dispersion is embraced by the range set as the condition described above or not. Through this determination, the behavior presuming unit 23 may presume the behavior of the watching target person with respect to the target object.

In the present embodiment, the target object serving as the reference of the behavior of the watching target person is the bed. This being the case, the detection area may be set above the bed to include at least the head of the watching target person when the watching target person behaves on the bed. Then, the range of the planar dimension and the dispersion range, which are defined as the conditions for presuming the behavior of the watching target person, may also be set targeting leastwise on the head of the watching target person.

In this case, the behavior presuming unit 23 estimates a head area corresponding to the head of the watching target person in the field, included in the detection area, of the foreground area. Then, the behavior presuming unit 23 calculates the total sum of the planar dimensions and the dispersion with respect to the estimated head area. Subsequently, the behavior presuming unit 23 determines whether or not the calculated total sum of the planar dimensions and the calculated dispersion with respect to the estimated head area are embraced by the ranges that are set targeting thereon, respectively. The behavior presuming unit 23 may thus presume the behavior of the watching target person in relation to the bed on the basis of the determining result.

Herein, if making use of only the head area for presuming the behavior of the watching target person in relation to the bed, the behavior presuming unit 23 mis-recognizes the object having the same surface shape as the head to be the real head, resulting in a possibility of mis-recognizing the behavior of the watching target person. This being the case, for enhancing accuracy of presuming the behavior of the watching target person, the range of the planar dimension and the dispersion range each becoming the condition for presuming the behavior of the watching target person, may be set targeting further on the shoulder of the watching target person.

Then, in the field, included in the detection area, of the foreground area, the behavior presuming unit 23 further estimates the shoulder area corresponding to the shoulder of the watching target person from an area adjacent to the head area. The behavior presuming unit 23 calculates the total sum of the planar dimensions and the dispersion with respect to the estimated shoulder area. Then, the behavior presuming unit 23 further determines whether or not the total sum of the planar dimensions and the dispersion with respect to the estimated shoulder area are embraced by the ranges that are set targeting thereon, respectively. The behavior presuming unit 23 may thus presume a get-up state of the watching target person on the bed on the basis of the determining result. The shoulder area is an area having a wider spread continuously from the head area than this head area. The behavior presuming unit 23 can therefore enhance the accuracy of estimating the head area by taking such a relationship between the head area and the shoulder area into consideration.

Furthermore, the behavior presuming unit 23 may presume the get-up state of the watching target person on the bed by use of the head area and the shoulder area. For instance, the behavior presuming unit 23 may presume, based on the positional relationship between the head area, the shoulder area and the bed in the real space, the behavior of the watching target person, i.e., at least any one of the get-up state on the bed, the sitting-on-bed-edge state, the over-fence state of the body from the bed, the come-down state from the bed and the leaving-bed state from the bed.

As described above, there is a case in which the detection area is set above the bed to include at least the head of the watching target person when the watching target person behaves on the bed. In this case, the watching target person, after conducting any one of behaviors (states) such as a sitting-on-bed-edge state, a body-moving-over-fence state, a come-down state from the bed and a leaving state from the bed, has a high possibility of moving outside the detection area. To cope with this, the behavior presuming unit 23 presumes the behavior of the watching target person by use of the captured image 3 acquired after presuming anyone of the above-mentioned behaviors of the watching target person. In this case, when presuming any one of the behaviors, the position of the head area and the position of the shoulder area are set as the references. Then, the range of the detection area may be changed based on these references to become an area of the range where the head and the shoulder of the watching target person are assumed to exist.

Note that the type of the depth sensor or the camera and the measurement method for acquiring the depth information used for presuming the behavior of the watching target person may be properly selected corresponding to the embodiment. As in the present embodiment, however, if watching the watching target person in the place for sleeping, sufficient brightness is not gained in the image capturing range where the depth is acquired as the case may be. This being the case, in the present embodiment, the camera 2 may include the depth sensor for measuring the depth on the basis of the irradiation of the infrared-rays. This configuration enables the depth of the object to be acquired without being affected by the brightness in the place where the watching target person is watched. Then, the depth sensor for measuring the depth on the basis of the irradiation of the infrared-rays may also acquire the depth information.

Moreover, the information processing apparatus 1 according to the present embodiment may output the captured image 3 to a display device such as a display connected to the information processing apparatus 1. In this case, the information processing apparatus 1 may include a display control unit 26. The display control unit 26 displays the captured image 3 formed so that the grayscale values of the pixels within the captured image 3 are determined corresponding to the depths of the respective pixels. However, the captured image 3 formed so that the grayscale values of the pixels are determined corresponding to the depths of the respective pixels is, as depicted in FIG. 2, the image from which the user is hard to recognize the object within the captured image 3. Accordingly, the display control unit 26 displays the captured image 3 on the display device in a way that may colorize the areas distinguished as specific areas within the captured image 3. This contrivance gets the user to easily grasp the specific areas within the captured image 3.

Further, the information processing apparatus 1 according to the present embodiment includes the notifying unit 24. The notifying unit 24 issues, if the presumed behavior of the watching target person is the behavior indicating a symptom that the watching target person will encounter with an impending danger, notification for informing the symptom to a watcher who watches the watching target person. Herein, the watcher is the person who watches the behavior of the watching target person and is exemplified by a nurse, staff and a caregiver if the watching target persons are the inpatient, the care facility tenant, the care receiver, etc. Moreover, the notification for informing of the symptom that the watching target person will encounter with the impending danger may be issued in cooperation with equipment installed in a facility such as a nurse call system.

Note that the present embodiment discusses the example in which each of these functions is realized by a general-purpose CPU. Some or the whole of these functions may, however, be realized by one or a plurality of dedicated processors. For example, in the case of not issuing the notification for informing of the symptom that the watching target person will encounter with the impending danger, the notifying unit 24 may be omitted.

§3 Operational Example

Figure 6:
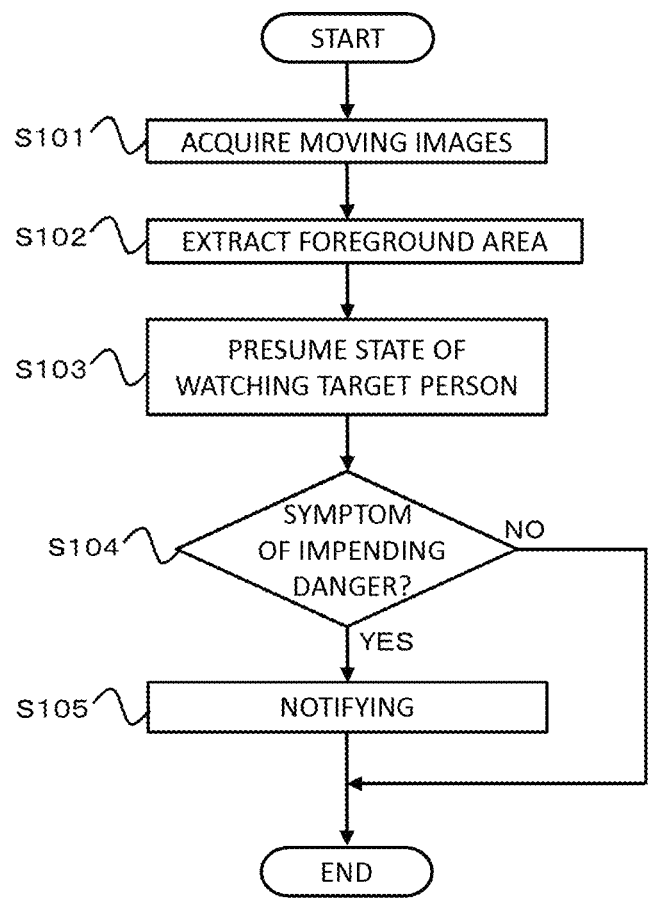
FIG. 6 is a diagram illustrating a processing procedure of the information processing apparatus according to the embodiment.

FIG. 6 illustrates an operational example of the information processing apparatus 1 according to the present embodiment. It is to be noted that a processing procedure of the operational example given in the following discussion is nothing but one example, and the respective processes may be replaced to the greatest possible degree. Further, as for the processing procedure of the operational example given in the following discussion, the processes thereof can be properly omitted, replaced and added corresponding to the embodiment. For instance, in the case of not issuing the notification for informing of the symptom that the watching target person will encounter with the impending danger, steps S104 and S105 may be omitted.

In step S101, the control unit 11 functions as the image acquiring unit 21. The control unit 11 acquires the captured image 3. The captured image 3 is obtained by capturing the image of the watching target person whose behavior is watched and the image of the target object serving as the reference for the behavior of the watching target person. The captured image 3 contains the depth information indicating the depths obtained on the pixel-by-pixel basis within the captured image 3. In the present embodiment, the control unit 11 acquires, from the camera 2, the captured image 3 captured as the image of the inpatient or the care facility tenant and the image of the bed.

Figure 7:
FIG. 7 is a view illustrating captured image acquired by the information processing apparatus according to the embodiment.

Herein, the captured image 3 acquired by the control unit 11 will be described with reference to FIG. 7. FIG. 7 illustrates the captured image 3 acquired by the control unit 11. The grayscale values of the pixels of the captured image 3 illustrated in FIG. 7 are determined corresponding to the depths of the pixels. Namely, the grayscale values (pixel values) of the pixels correspond to the depths of the fields (i.e., the objects) projected in the pixels. Thus, the depth information contained in the captured image 3 may be expressed as the grayscale values (pixel values) of the pixels.

Inclusive of a case of the depths being thus expressed by the grayscale values, the captured image 3 contains the depth information representing the depths obtained on the pixel-by-pixel basis. Hence, the control unit 11 can specify positions of the fields (i.e., the objects) projected in the pixels in the real space. Namely, the control unit 11 can specify the positions of the objects projected in the pixels in the three-dimensional space (the real space) from the positions (two dimensional information) of the pixels and from the depths of the pixels within the captured image 3. A state of the real space is illustrated in FIG. 8 that follows.

Figure 8:
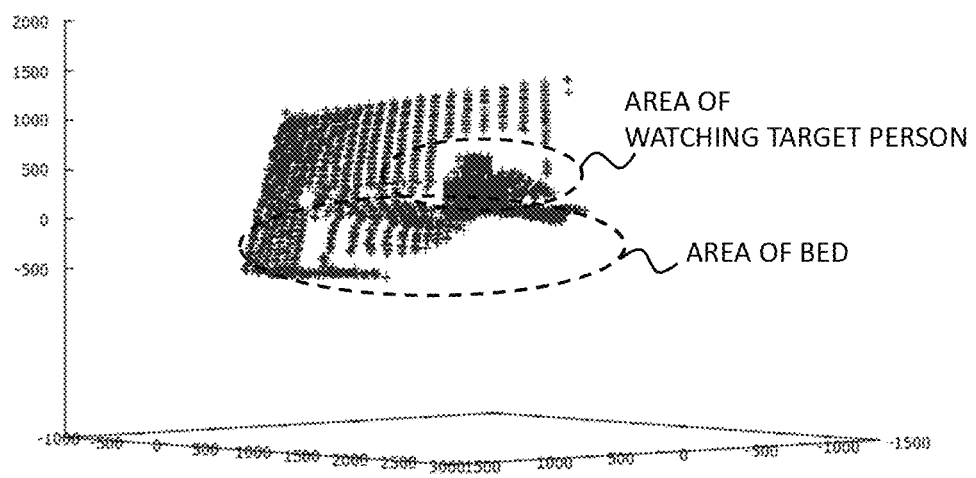
FIG. 8 is a view illustrating a 3D-distribution of an object in an image capturing range that is specified based on depth information contained in the captured image.

FIG. 8 depicts a 3D-distribution of the positions of the objects within the image capturing range. These positions are specified based on the depth information contained in the captured image 3. The pixels are plotted by the positions and the depths within the captured image 3 in the three-dimensional space. The 3D-distribution as illustrated in FIG. 8 can be thereby created. The control unit 11 generates data of the 3D-distribution depicted in FIG. 8 by making use of the depth information within the captured image 3. Based on the thus-generated data, the control unit 11 may recognize a positional relationship between the watching target person and the target object (bed) in the real space. Further, the control unit 11 refers to the depth information within the captured image 3 in response to a request without generating the data of the 3D-distribution illustrated in FIG. 8. Through this reference, the control unit 11 may recognize the positional relationship between the watching target person and the target object (bed) in the real space in the state as illustrated in FIG. 5. In other words, the control unit 11 may recognize the positional relationship between the watching target person and the target object (bed) in the real space without using the data expressed in the 3D-distribution.

Note that the watching target person and the bed exist in the areas each indicated by dotted lines in FIG. 8. As described above, the depth of the object is obtained with respect to the surface of the object. Therefore, the positions for plotting the pixels are, to be specific, positions on the surface of the watching target person and the surface of the bed, which are projected within the captured image 3. The control unit 11 recognizes the positional relationship between the watching target person and the bed in these on-surface positions in the real space.

Herein, the information processing apparatus 1 according to the present embodiment is utilized for watching the inpatient or the care facility tenant in the medical treatment facility or the care facility. In this case, the control unit 11 may obtain the image in a way that synchronizes with the video signals of the camera 2. Then, the control unit 11 may promptly execute the processes in step S102 through step S105, which will be described later on, with respect to the acquired images. The information processing apparatus 1 consecutively executes this operation without interruption, thereby realizing real-time image processing and enabling the behaviors of the inpatient or the care facility tenant to be watched in real time.

Referring back to FIG. 6, in step S102, the control unit 11 functions as the foreground extraction unit 22. The control unit 11 extracts a foreground area of the captured image 3. The foreground image is extracted from the difference between the captured image 3 and the background image of the background of the captured image 3 acquired in step S101, the background image being set to include the depth of this background. Herein, the background image is defined as data used for extracting the foreground area. For example, this background image data is generated by averaging several frames of the captured image 3, the frames being obtained when the information processing apparatus 1 starts operating (when starting watching the watching target person). At this time, the background image is generated to include the depth information.

Figure 9:
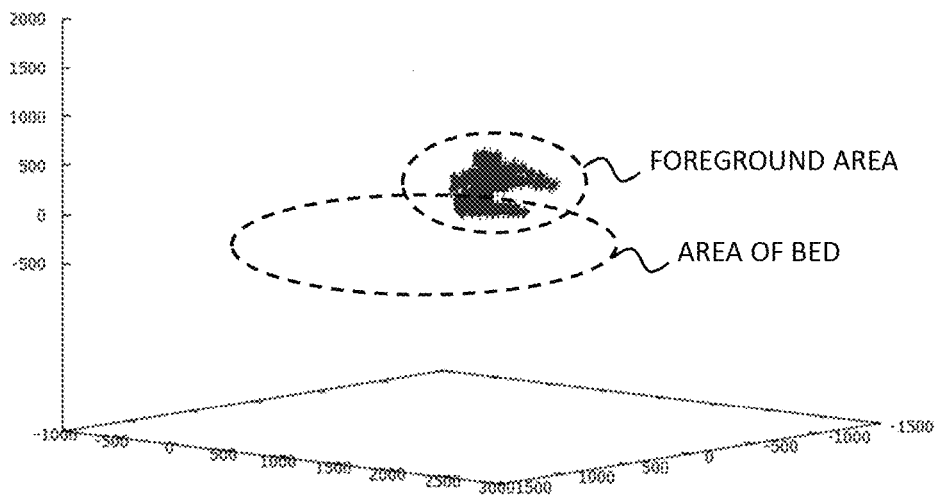
FIG. 9 is a view illustrating the 3D-distribution of a foreground area extracted from the captured image.

FIG. 9 illustrates the 3D-distributions of the foreground areas extracted from the captured image 3 in the objects depicted in FIG. 8. More specifically, FIG. 9 illustrates the 3D-distributions of the foreground area extracted when the watching target person gets up on the bed. The foreground area extracted by using the background image described above appears in position that changes from the state indicated by the background image in the real space. Therefore, when the watching target person moves on the bed, the area covering the movement of the watching target person changes from the background image and is extracted as the foreground area. For example, in the example of FIG. 9, an area of an upper half of the body moving when the watching target person takes the get-up behavior on the bed, is extracted as the foreground area. The control unit 11 grasps the behavior of the watching target person by making use of such foreground area as described above.

Note that the background and the foreground may be separated by use of a background difference method in step S102. The background difference method can be exemplified such as a method of separating the background and the foreground on the basis of a difference between the background image described above and the input image (the captured image 3), a method of separating the background and the foreground by use of three frames of images different from each other and a method of separating the background and the foreground by applying a statistic model. The method of extracting the foreground area may not be limited in particular and may be properly selected corresponding to the embodiment.

Referring back to FIG. 6, in step S103, the control unit 11 functions as the behavior presuming unit 23. The control unit 11 refers to the depths of the pixels within the foreground area extracted in step S102. Then, the control unit 11 determines, based on these depths, whether the positional relationship between the foreground area and the area of the target object in the real space satisfies the condition or not, the condition being set on the premise that the extracted foreground area is related to the behavior of the watching target person. The control unit 11 thus presumes the behavior of the watching target person with respect to the target object on the basis of the determining result.

As described above, when the watching target person moves, the area covering the movement of the watching target person is extracted as the foreground area in the process of step S102. Such being the case, the condition for presuming the behavior of the watching target person is set on the premise that the foreground area extracted in step S102 is related to the behavior of the watching target person. Herein, the condition for presuming the behavior of the watching target person may be properly selected corresponding to the presumption target behavior.

Note that the information processing apparatus 1 in the present embodiment is utilized as the watching apparatus (the watching system) for watching the behavior of the inpatient or the care facility tenant. Therefore, in the present embodiment, the control unit 11 presumes, as the behavior of the watching target person, at least any one of the behaviors (states) such as the get-up state on the bed, the sitting-on-bed-edge state, the over-bed-fence state (the body moving over the bed fence), the come-down state from the bed and the leaving-bed state from the bed.

(1) First Example of Presumption Condition

For example, the condition for presuming the behavior of the watching target person may involve setting a condition that follows. This condition is given for estimating whether or not the foreground area formed of the pixels (pixel count) equal to or larger than a threshold value appears in a certain area taking a predetermined positional relationship with the area covering the existence of the target object. This condition will be described by giving an example of the behavior of the watching target person on the bed.

(a) Get-Up State

When the watching target person gets up on the bed, as illustrated in FIG. 9, the foreground area is assumed to appear in an upper half of the area in the longitudinal direction of the bed and upwardly of the bed as well. Then, when the foreground area formed of the pixels equal to or larger than the threshold value appears in the upper half of the area in the longitudinal direction of the bed and upwardly of the bed, the control unit 11 may presume that the watching target person gets up on the bed.

(b) Sitting-on-Bed-Edge State

When the watching target person sits on the edge of the bed, it is assumed that the foreground area appears in an area peripheral to a side frame of the bed and in an area from upward to downward of the bed. Then, the control unit 11 may presume the sitting-on-bed-edge state of the watching target person when the foreground area formed of the pixels equal to or larger than the threshold value appears in the area peripheral to the side frame of the bed and in the area from upward to downward of the bed.

(c) Over-Bed-Fence State (Body Moving Over Bed Fence)

When the watching target person moves over the bed fence (over-bed-fence state), it is assumed that the foreground area appears in the area peripheral to the side frame of the bed and in an area extending toward a lower portion than a position for estimating the sitting-on-bed-edge state as well as upwardly of the bed. Then, the control unit 11 may presume the over-bed-fence state of the watching target person when the foreground area formed of the pixels equal to or larger than the threshold value appears in the area peripheral to the side frame of the bed and in the area extending toward the lower portion than the position for estimating the sitting-on-bed-edge state as well as upwardly of the bed.

(d) Come-Down State

When the watching target person comes down from the bed, the foreground area is assumed to appear in the area peripheral to the side frame of the bed and on the underside of the bed. Then, the control unit 11 may presume that the watching target person comes down from the bed when the foreground area formed of the pixels equal to or larger than the threshold value appears in the area peripheral to the side frame of the bed and on the underside of the bed.

(e) Leaving-Bed State

When the watching target person leaves the bed, it is assumed that the foreground area appears in the area peripheral to the side frame of the bed and more upwardly of the bed than the position for estimating the sitting-on-bed-edge state.

Then, the control unit 11 may presume the leaving-bed state of the watching target person when the foreground area formed of the pixels equal to or larger than the threshold value appears in the area peripheral to the side frame of the bed and more upwardly of the bed than the position for estimating the sitting-on-bed-edge state.

(f) Others

As demonstrated in the states (a)-(e), under the present conditions, it is presumed that the watching target person conducts each of the predetermined behaviors when the foreground area formed of the pixels equal to or larger than the threshold value appears in the range where the foreground area is assumed to be appear if the watching target person performs each of the predetermined behaviors on the bed. The behaviors, for which the conditions described above are set, are not limited to the behaviors demonstrated in the states (a)-(e) and may be properly selected corresponding to the embodiment. Moreover, the threshold value for presuming each behavior may be properly determined corresponding to each behavior.

(2) Second Example of Presumption Condition

Furthermore, for instance, an average position of the foreground area in the real space may be utilized as the condition for presuming the behavior of the watching target person. To be specific, there is a condition for estimating whether or not the average position of the foreground area is contained in an area taking a predetermined positional relationship with the area covering the existence of the target object. This condition may be set as the condition for presuming the behavior of the watching target person. Note that the average position of the foreground area is calculated by averaging, e.g., the positions and the depths of the pixels extracted as the foreground area within the captured image 3.

(g) Get-Up State

When the watching target person gets up on the bed, as described above, it is assumed that the foreground area appears in the upper half of the area in the longitudinal direction of the bed and upwardly of the bed. Then, the control unit 11 may presume the get-up state of the watching target person on the bed when the average position of the foreground area extracted in step S102 is contained in a range in the vicinity of substantially the center of the upper half of the area in the longitudinal direction of the bed and upward of the bed.

(h) Sitting-on-Bed-Edge State

When the watching target person sits on the edge of the bed, it is assumed that the foreground area appears in the area peripheral to the side frame of the bed and in the area from upward to downward of the bed. Then, the control unit 11 may presume the sitting-on-bed-edge state of the watching target person when the average position of the foreground area is contained in a range in the vicinity of the side frame of the bed and slightly upward of the bed.

(i) Over-Bed-Fence State (Body Moving Over Bed Fence)

When the watching target person moves over the bed fence (over-bed-fence state), it is assumed that the foreground area appears in the area peripheral to the side frame of the bed and in the area extending toward the lower portion than the position for estimating the sitting-on-bed-edge state as well as upwardly of the bed. Then, the control unit 11 may presume the over-bed-fence state of the watching target person when the average position of the foreground area is contained in a range in the vicinity of the side frame of the bed and substantially flush with the bed.

(j) Come-Down State

When the watching target person comes down from the bed, the foreground area is assumed to appear in the area peripheral to the side frame of the bed and on the underside of the bed. Then, the control unit 11 may presume that the watching target person comes down from the bed when the average position of the foreground area is contained in a range outside of the side frame of the bed and on the underside of the bed.

(k) Leaving-Bed State

When the watching target person leaves the bed, it is assumed that the foreground area appears in the area peripheral to the side frame of the bed and more upwardly of the bed than the position for estimating the sitting-on-bed-edge state. Then, the control unit 11 may presume the leaving-bed state of the watching target person when the average position of the foreground area is contained in a range outside of the side frame of the bed and upward of the bed.

(l) Others

As demonstrated in the states (g)-(k), under the present conditions, the range of the average position of the foreground area is set in the real space, the foreground area being assumed to appear when the watching target person conducts the respective behaviors on the bed with respect to the presumption target behaviors. The behaviors, for which the conditions described above are set, are not limited to the behaviors demonstrated in the states (g)-(k) and may be properly selected corresponding to the embodiment. Moreover, the relationship between the average position of the foreground area and the presumption target behavior may be properly selected corresponding to the embodiment.

(3) Supplement

The condition for presuming the behavior of the watching target person with respect to the target object may be properly selected corresponding to the embodiment. The control unit 11 previously retains information on body shapes of the watching target person when conducting the presumption target behaviors. Thus, the control unit 11 may calculate correlation coefficients between the body shapes and the foreground area. Then, the control unit 11 may presume the behavior of the watching target person on the basis of the calculated correlation coefficients. Further, the control unit 11 extracts characteristic quantities from the distribution of the pixels within the foreground area. Then, the control unit 11 may presume the behavior of the watching target person on the basis of the extracted characteristic quantities. Moreover, the control unit 11 may make the use of a condition given by combining the first and second presumption conditions (1), (2) by way of the condition for presuming the behavior of the watching target person with respect to the target object.

Further, in the examples described above, the conditions for presuming the respective behaviors are set, in which the position of the bed in the real space is set as the reference. Herein, the position of the target object (bed) in the real space may be preset and may also be set in the way of being specified by a method that will be described later on. Further, the position of the target object (bed) in the real space may be specified based on processing such as image recognition.

In step S104, the control unit 11 determines whether or not the behavior presumed in step S103 is the behavior indicating the symptom that the watching target person will encounter with the impending danger. If the behavior presumed in step S103 is the behavior indicating the symptom that the watching target person will encounter with the impending danger, the control unit 11 advances the processing to step S105. Whereas if the behavior presumed in step S103 is not the behavior indicating the symptom that the watching target person will encounter with the impending danger, the control unit 11 finishes the processes related to the present operational example.

The behavior set as the behavior indicating the symptom that the watching target person will encounter with the impending danger, may be properly selected corresponding to the embodiment. For instance, an assumption is that the sitting-on-bed-edge state is set as the behavior indicating the symptom that the watching target person will encounter with the impending danger, i.e., as the behavior having a possibility that the watching target person will come down or fall down. In this case, the control unit 11, when presuming in step S103 that the watching target person is in the sitting-on-bed-edge state, determines that the behavior presumed in step S103 is the behavior indicating the symptom that the watching target person will encounter with the impending danger.

Incidentally, when determining whether or not there exists the symptom that the watching target person will encounter with the impending danger, it is better to take account of transitions of the behaviors of the watching target person as the case may be. For example, it can be presumed that the watching target person has a higher possibility of coming down or falling down in a transition to the sitting-on-bed-edge state from the get-up state than a transition to the sitting-on-bed-edge state from the leaving-bed state. Then, in step S104, the control unit 11 may determine, based on the transitions of the behavior of the watching target person, whether the behavior presumed in step S103 is the behavior indicating the symptom that the watching target person will encounter with the impending danger or not.

For instance, it is assumed that the control unit 11, when periodically presuming the behavior of the watching target person, presumes that the watching target person becomes the sitting-on-bed-edge state after presuming that the watching target person has got up. At this time, the control unit 11 may presume in step S104 that the behavior presumed in step S103 is the behavior indicating the symptom that the watching target person will encounter with the impending danger.

In step S105, the control unit 11 functions as the notifying unit 24. The control unit 11 issues the notification for informing of the symptom that the watching target person will encounter with the impending danger to the watcher who watches the watching target person.

The control unit 11 issues the notification by using a proper method. For example, the control unit 11 may display, by way of the notification, a window for informing the watcher of the symptom that the watching target person will encounter with the impending danger on a display connected to the information processing apparatus 1. Further, e.g., the control unit 11 may give the notification via an e-mail to a user terminal of the watcher. In this case, for instance, an e-mail address of the user terminal defined as a notification destination is registered in the storage unit 12 on ahead. Then, the control unit 11 gives the watcher the notification for informing of the symptom that the watching target person will encounter with the impending danger by making use of the e-mail address registered beforehand.

Further, the notification for informing of the symptom that the watching target person will encounter with the impending danger may be given in cooperation with the equipment installed in the facility such as the nurse call system. For example, the control unit 11 controls the nurse call system connected via the external I/F 15, and may call up via the nurse call system as the notification for informing of the symptom that the watching target person will encounter with the impending danger. The facility equipment connected to the information processing apparatus 1 may be properly selected corresponding to the embodiment.

Note that the information processing apparatus 1, in the case of periodically presuming the behavior of the watching target person, may periodically repeat the processes given in the operational example described above. An interval of periodically repeating the processes may be properly selected. Furthermore, the information processing apparatus 1 may also execute the processes given in the operational example described above in response to a request of the user (watcher).

As discussed above, the information processing apparatus 1 according to the present embodiment estimates the positional relationship between the watching target person and the target object in the real space by making use of the depth information representing the depth of the object, thereby presuming the behavior of the watching target person. Hence, the information processing apparatus 1 according to the present embodiment presumes the behavior of the watching target person in accordance with the positional relationship between the watching target person and the target object in the real space. Therefore, the information processing apparatus 1 can presume the behavior suited to the state of the watching target person in the real space.

§4 Modified Example

The in-depth description of the embodiment of the present invention has been made so far but is no more than the exemplification of the present invention in every point. The present invention can be, as a matter of course, improved and modified in the variety of forms without deviating from the scope of the present invention.

(1) Setting of Detection Area

As described above, the foreground area extracted in step S102 has the possibility of containing the areas unrelated to the behaviors of the watching target person. This being the case, the control unit 11 functions as the behavior presuming unit 23 and thus presumes the behavior of the watching target person. On this occasion, there may be provided the detection area for defining a range set as a processing target for the presumption of the behavior. The detection area will be described with reference to FIG. 10.

Figure 10:
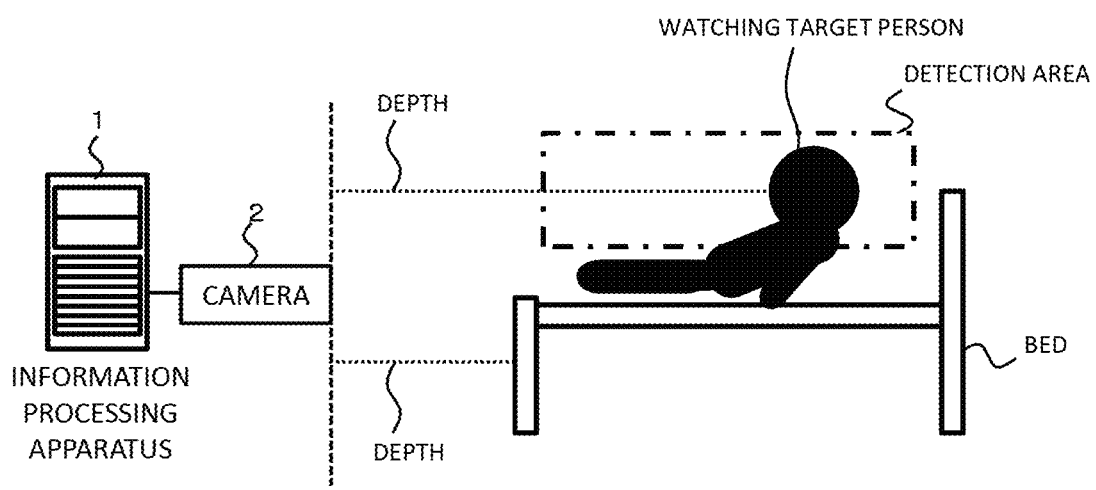
FIG. 10 is a view illustrating a detection area set in a real space.

FIG. 10 illustrates one example of the detection area set within the real space on the occasion of targeting on the get-up state of the watching target person for the presumption of the behavior. For example, the get-up state of the watching target person is presumed. In this case, it does not happen that the foreground area related to the get-up state of the watching target person on the bed is detected in a range exclusive of the area upward of the bed, the range being exemplified such as the area extending from the lower edge of the bed toward the camera. If the area having no such probability that the foreground area related to the get-up state is to be detected is set as the processing target for the presumption of the behavior, it follows that the control unit 11 performs extra processes. Moreover, the control unit 11 comes to have a possibility of mis-presuming the behavior of the watching target person.

Such being the case, for the process of presuming the behavior, the detection area is provided as illustrated in FIG. 10. Then, the extra processes are reduced by omitting the processes for the areas other than the detection area. This contrivance enables prevention of the mis-presumption of the behavior of the watching target person. Note that the detection area such as this may be preset and may also be set by the user. Further, the information processing apparatus 1 may retain information enabling the detection area to be set corresponding to the presumption target behavior and the target object.

(2) Designation of Area Covering Existence of Target Object

Moreover, in the embodiment, the behavior of the watching target person is presumed corresponding to the positional relationship between the foreground area and the area of the target object in the real space. However, the area covering the existence of the target object may be designated by the user. In this case, the control unit 11 may accept the designation of the area covering the existence of the target object in the captured image 3.

Herein, the control unit 11 may function as the display control unit 26 in order to display the captured image 3 on the occasion of accepting the designation of the area covering the existence of the target object. The display control unit 26 displays the captured image 3 acquired in step S101 on the display and suchlike connected to the information processing apparatus 1. For instance, the control unit 11 functions as the display control unit 26 and may display the captured image 3 on the display device, the captured image 3 being formed so that the grayscale values (pixel values) of the pixels in the captured image 3 are determined corresponding to the depths of the pixels as illustrated in FIG. 2 etc. The user designates, e.g., the area covering the existence of the target object (bed) in the captured image 3 displayed in this way.

Figure 11:
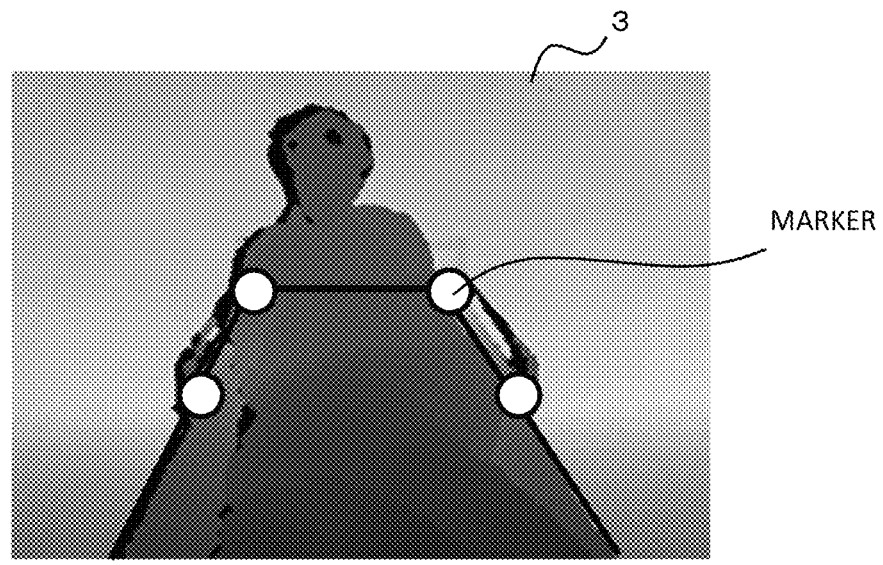
FIG. 11 is a view illustrating a screen for accepting designation of a target object in the captured image.

FIG. 11 depicts a screen for accepting the designation of the area of the target object (bed) in the captured image 3. On an operation screen depicted in FIG. 11, the user designates a range covering the existence of the target object (bed). This range is designated by moving a position of a marker on the captured image 3 displayed on the display device in a way that operates an input device (mouse etc.) connected to the information processing apparatus 1.

Note that on the screen illustrated in FIG. 11, the control unit 11 prompts the user to designate the range of the bed by operating four pieces of markers. The four makers are positioned corresponding to two angles on the side of a head board of the bed and two middle points of the both of the side frames of the bed. The designation of the range of the rectangular bed involves using not the two angles of the lower edges of the bed but the two middle points of the side frames of the bed. This is because of having a possibility that the bed is not completely covered by the image capturing range.

Namely, there is such a case that the bed is not completely covered by the image capturing range of the camera 2, depending on a position where the camera 2 is disposed and a size of the bed. In this case, if the range of the bed is defined by the four angles of the two upper edges and two lower edges of the bed, the user is unable to designate the positions of the two angles of the lower edges of the bed. Such being the case, as illustrated in FIG. 11, the control unit 11 may prompt the user to designate not the angles, to be designated, of the target object but points on the lines each connecting the two angles. Note that the points on the lines each connecting the two angles may be points exclusive of the middle points. Namely, in the example of FIG. 11, the two points used in place of the angles of the bed may be points on the side frames of the bed in the longitudinal direction but may not be the middle points. It is to be noted that in the following discussion, the two angles on the side of the head board of the bed are referred to as "head-sided two points of the bed", and the middle points of the two side frames of the bed are termed "leg-sided two points of the bed".

When the area covering the existence of the target object is thus designated (defined), the control unit 11 acquires the depth of the target object existing in the designated area from the captured image 3. Herein, the control unit 11 may specify the depth of the target object from the depth information contained in the captured image 3. As will be described later on, the depth of the target object may be specified without using the depth information.

In the case of specifying the depth of the target object from the depth information, the control unit 11 refers to the depth information of the pixels within the range designated by the user and is thereby enabled to specify the depth of the target object. The case of specifying the depth of the target object without using the depth information will be explained later on. If capable of specifying the depth of the target object, the position of the target object in the captured image 3 is already designated. Hence, the control unit 11 can specify the position of the target object in the real space.

(3) Setting of Detection Area Corresponding to Area of Target Object

As described above, when the user designates the position of the target object in the real space, the control unit 11 can set the detection area in accordance with the position of the target object in the real space. Namely, the control unit 11 may function as the detection area setting unit 25. The control unit 11 accepts the designation of the area covering the existence of the target object in the captured image 3. Then, the control unit 11 acquires the depth of the target object existing in the designated area from the captured image 3. The control unit 11 specifies the position of the target object in the real space on the basis of the acquired depth of the target object. Subsequently, the control unit 11 sets the detection area corresponding to the specified position of the target object in the real space.

For example, as described above, in the case of presuming the get-up state of the watching target person on the bed, the detection area may be set above the bed. In this case, the detection area may be set above the bed and can therefore be set based on the bed (target object) serving as the reference. Accordingly, the control unit 11 retains, e.g., information of various conditions about the detection area located corresponding to the position of the target object in the real space. The control unit 11 may set the detection area corresponding to the position of the target object in the real space by making use of the information of the conditions. For example, in the example of FIG. 10, the control unit 11, after specifying the position of the target object (bed) in the real space, functions as the detection area setting unit 25 and may locate the detection area upward of the bed.

(4) Specifying of Position of Target Object in Real Space without Using Depth Information The depth largely varies at the border of the object as the case may be. To give an explanation by taking FIG. 11 for example, the user designates the positions of the markers with deviations outward from the border of the bed. In this case, when acquiring the depth of the bed from the depth information contained in the captured image 3, such a situation can occur that a depth largely different from an originally estimated value of the depth of the bed is to be acquired. To cope with this difference, the control unit 11 may specify the depth of the target object without using the depth information when the user designates the area covering the existence of the target object.

In this case, the control unit 11 functions as, e.g., the detection area setting unit 25 and associates a length of the target object in the captured image 3 with a length of the target object in the real space, this latter length being set as a predetermined value. Thus, the control unit 11 calculates the depth of the target object and may acquire the depth of the target object from the captured image 3 on the basis of the association result.

Note that a field of the target object with the predetermined value being set may be properly selected corresponding to the embodiment. Furthermore, the length of the target object in the real space, which is associated with the length of the target object in the captured image 3, may be given beforehand and may also be designated by the user. The present modified example exemplifies, with a crosswise length of the bed being a known value, an instance of calculating a depth at the middle point of the head-sided two points of the bed and a depth at the middle point of the leg-sided two points of the bed illustrated in FIG. 11 by use of this known value.

Herein, the control unit 11 associates the number of pixels (pixel count) between the head-sided two points of the bed or the pixel count between the leg-sided two points of the bed in the captured image 3 with the known crosswise length of the bed as they are. With this contrivance, the control unit 11 may calculate the depth at the middle point of the head-sided two points of the bed or the middle point of the leg-sided two points of the bed. As will be explained later on in FIGS. 13 and 14, however, the image of the target object is captured with a deviation from the center of the captured image 3. In this case, it is consequently known that the target object in the captured image 3 takes a shape varied from the shape of the target object in the case of capturing the image of the target object at the center of the captured image 3. This being the case, the control unit 11 may correct the length (pixel count) between the head-sided two points of the bed and the length between the leg-sided two points of the bed in the captured image 3 by a method given below.

Figure 12:
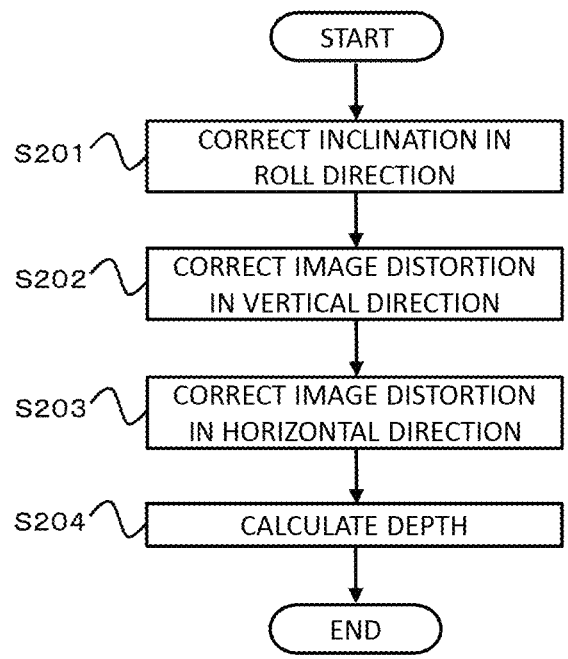
FIG. 12 is a diagram illustrating a processing procedure for specifying a position of the target object within the captured image in the real space.

FIG. 12 illustrates a processing procedure of correcting the length (pixel count) between the head-sided two points of the bed and the length between the leg-sided two points of the bed in the captured image 3, and thereafter calculating the depth at the middle point between the head-sided two points of the bed or the depth at the middle point between the leg-sided two points of the bed. It is to be noted that the processing procedure given in the following discussion is nothing but one example, and the respective processes may be replaced to the greatest possible degree. Further, as for the processing procedure given in the following discussion, the processes thereof can be properly omitted, replaced and added corresponding to the embodiment.

At first, in step S201, the control unit 11 rotates coordinates of the four markers by making use of a roll angle of the camera 2. The control unit 11 thus obtains positions of the four makers in the captured image 3 in a state where the camera 2 is not rolled (the roll angle is 0 degree). An arithmetic operation of this rotation may involve using polar coordinates, a complex plane, a matrix, etc. Further, the roll angle of the camera 2 may be properly obtained corresponding to the embodiment. For instance, the roll angle of the camera 2 may be obtained from a motion sensor equipped in the camera 2 and may also be designated by the user.

Figure 13:
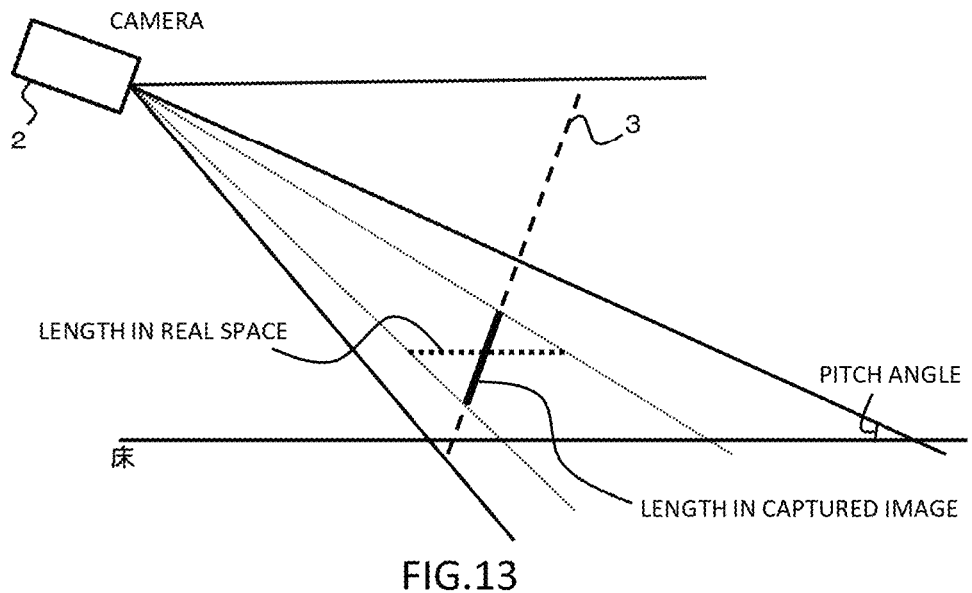
FIG. 13 is a view illustrating a lengthwise image distortion of the object in a vertical direction, the distortion being caused by a pitch angle of a camera and by projecting the object with a deviation from the center of the captured image in the vertical direction.

In next step S202, the control unit 11 corrects a variation in shape (image distortion) of the bed in the vertical direction. The image distortion of the bed in the vertical direction will be described with reference to FIG. 13. FIG. 13 illustrates a lengthwise image distortion of the bed in the vertical direction. This lengthwise image distortion of the bed is derived from affection caused by a pitch angle of the camera 2 and affection caused by projecting the bed with a deviation from the center of the captured image 3 in the vertical direction.

FIG. 13 depicts a situation as viewed from the camera in the crosswise direction. The bed is placed in a state horizontal to the floor. In this case, each of the length of the head-sided two points of the bed and the length of the leg-sided two points of the bed, has a lengthwise component in the depthwise direction of the camera 2 and a lengthwise component in the crosswise direction thereof. In this instance, as illustrated in FIG. 13, the lengthwise component (indicated by a dotted line in FIG. 13) in the depthwise direction of the camera 2, the pitch angle of the camera 2 and the deviation from the center of the captured image 3 in the vertical direction, are affected by each other, thereby generating a length (indicated by a solid line in FIG. 13) in the captured image 3 in the vertical direction.

The control unit 11 can specify the length (indicated by the solid line in FIG. 13) in the vertical direction, which is generated within the captured image 3, from the captured image 3. Then, the control unit 11 makes use of an angular relationship between the lengthwise component (indicated by the dotted line in FIG. 13) in the depthwise direction of the camera 2 illustrated in FIG. 13 and the length (indicated by the solid line in FIG. 13) in the vertical direction that is generated within the captured image 3. The control unit 11 can calculate, based on this angular relationship, the lengthwise component (indicated by the dotted line in FIG. 13) in the depthwise direction of the camera 2, of each of the length between the head-sided two points of the bed and the length between the leg-sided two points of the bed, from the length (indicated by the solid line in FIG. 13) in the vertical direction that is generated within the captured image 3. Accordingly, the control unit 11 can calculate the lengthwise component (indicated by the dotted line in FIG. 13) in the depthwise direction of the camera 2 from the length (indicated by the solid line in FIG. 13) in the vertical direction that is generated within the captured image 3. The control unit 11 is thereby enabled to correct the image distortion of the bed in the vertical direction.

Note that the control unit 11 may also calculate the lengthwise component (indicated by the dotted line in FIG. 13) in the depthwise direction of the camera 2 from the length (indicated by the solid line in FIG. 13) in the vertical direction that is generated within the captured image 3 in step S202. Herein, this calculation involves making use of a trigonometric ratio and suchlike. Further, the control unit may retain information representing an associative relationship between the lengthwise component (indicated by the dotted line in FIG. 13) in the depthwise direction of the camera 2, the pitch angle of the camera 2, the deviation from the center of the captured image 3 in the vertical direction and the length (indicated by the solid line in FIG. 13) in the vertical direction that is generated within the captured image 3. In this case, the control unit 11 refers to the retained information and is thereby enabled to acquire the lengthwise component (indicated by the dotted line in FIG. 13) in the depthwise direction of the camera 2, of each of the length between the head-sided two points of the bed and the length between the leg-sided two points of the bed, from the length (indicated by the solid line in FIG. 13) in the vertical direction that is generated within the captured image 3.

Note that the pitch angle of the camera 2 may be properly obtained corresponding to the embodiment as in the case of the roll angle. For example, the pitch angle of the camera 2 may be obtained from the motion sensor equipped in the camera 2 and may also be designated by the user.

Figure 14:
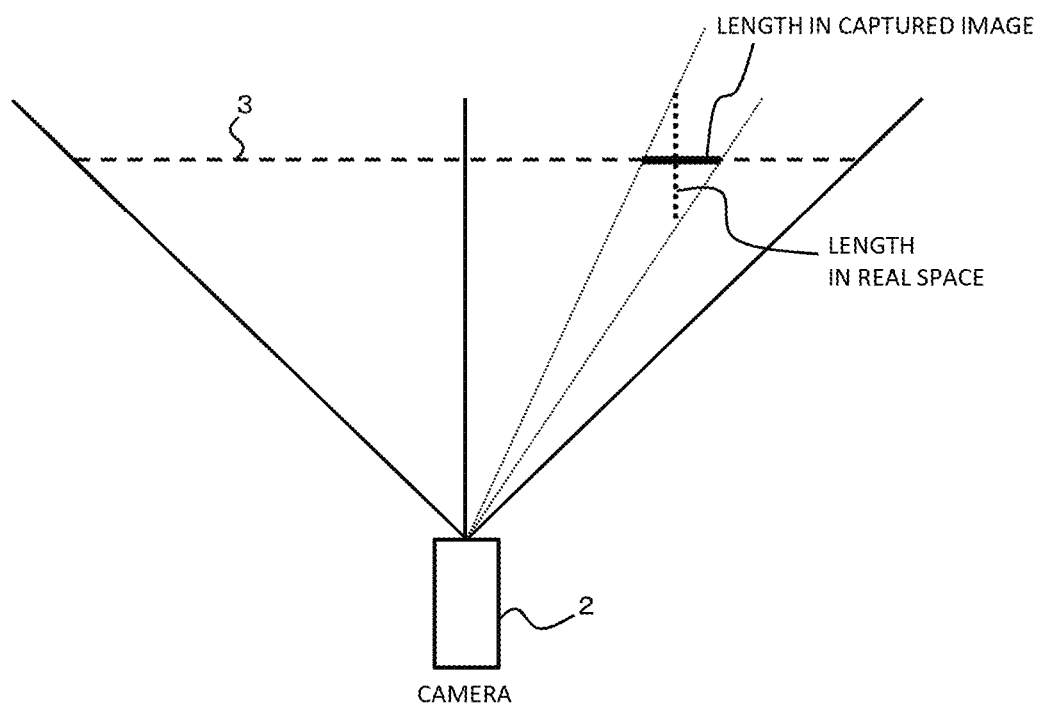
FIG. 14 is a view illustrating the lengthwise image distortion of the object in a horizontal direction, the distortion being caused by projecting the object with a deviation from the center of the captured image in the horizontal direction.

Referring back to FIG. 12, in next step S203, the control unit 11 corrects an image distortion of the bed in the crosswise direction. The image distortion of the bed in the crosswise direction will be described with reference to FIG. 14. FIG. 14 depicts the lengthwise image distortion of the bed in the crosswise direction, the distortion being derived from affection caused by projecting the bed with a deviation from the center of the captured image 3 in the crosswise direction.

FIG. 14 illustrates a situation as viewed from the camera in a direction from upward to downward. As illustrated in FIG. 14, a lengthwise component (indicated by a dotted line in FIG. 14, precisely a component in a direction of the pitch angle of the camera 2) in the depthwise direction of the camera 2 and a deviation from the center of the captured image 3 in the crosswise direction, are affected by each other, thereby generating a length (indicated by a solid line in FIG. 14) in the captured image 3 in the crosswise direction.

Herein, the lengthwise component (indicated by the dotted line in FIG. 14) in the depthwise direction of the camera 2 of each of the length between the head-sided two points of the bed and the length between the leg-sided two points of the bed has already been obtained in the process of step S202. This length component is therefore a known value at a point of time of step S203. Hence, the control unit 11 makes use of an angular relationship between the lengthwise component (indicated by the dotted line in FIG. 14) in the depthwise direction of the camera 2 illustrated in FIG. 14 and the length (indicated by the solid line in FIG. 14) in the crosswise direction that is generated in the captured image 3. The control unit 11 is thereby enabled to calculate the length (indicated by the solid line in FIG. 14) in the crosswise direction that is generated in the captured image 3 from the lengthwise component (indicated by the dotted line in FIG. 14) in the depthwise direction of the camera 2, which is obtained in step S202. Then, the control unit 11 eliminates the affection of the length (indicated by the solid line in FIG. 14) in the crosswise direction that is generated in the captured image 3 from the lengthwise component in the crosswise direction of the camera 2 of each of the length between the head-sided two points of the bed and the length between the leg-sided two points of the bed. With this elimination, the control unit 11 can correct the image distortion of the bed in the crosswise direction.

Note that the control unit 11 may also calculate the length (indicated by the solid line in FIG. 13) in the crosswise direction that is generated within the captured image 3 from each lengthwise component (indicated by the dotted line in FIG. 14) in the depthwise direction of the camera 2 by making use of the trigonometric ratio and suchlike in step S203. Moreover, the control unit 11 may retain information representing an associative relationship between the lengthwise component (indicated by the dotted line in FIG. 14) in the depthwise direction of the camera 2, the deviation from the center of the captured image 3 in the crosswise direction and the length (indicated by the solid line in FIG. 14) in the crosswise direction that is generated within the captured image 3. In this case, the control unit 11 refers to the retained information and is thereby enabled to acquire the length (indicated by the solid line in FIG. 14) in the crosswise direction that is generated within the captured image 3 from each lengthwise component (indicated by the dotted line in FIG. 14) in the depthwise direction of the camera 2.

In the processes of step S202 and step S203, the camera 2 captures the image of the bed at the center of the captured image. In this case, the control unit 11 acquires the lengthwise components in the depthwise and crosswise directions of the camera 2 of each of the length between the head-sided two points of the bed and the length at the between the leg-sided two points of the bed. Namely, the lengthwise image distortion of the bed in the captured image 3, which is caused by the deviation from the center of the captured image 3, is obviated at this point of time. Then, the control unit 11 calculates the length (pixel count) between the head-sided two points of the bed and the length (pixel count) between the leg-sided two points of the bed from the acquired lengthwise components in the depthwise and crosswise directions of the camera 2 by using a pythagorean theorem.

Referring back to FIG. 12, in final step S204, the control unit 11 associates the length (pixel count) between the head-sided two points of the bed and the length (pixel count) between the leg-sided two points of the bed that are obtained in steps up to S203 with the respective lengths in the real space. The control unit 11 obtains, based on these associated lengths, the depth at the middle point between the head-sided two points of the bed and the depth at the middle point between the leg-sided two points of the bed, respectively. This process will be described with reference to FIG. 15.

Figure 15:
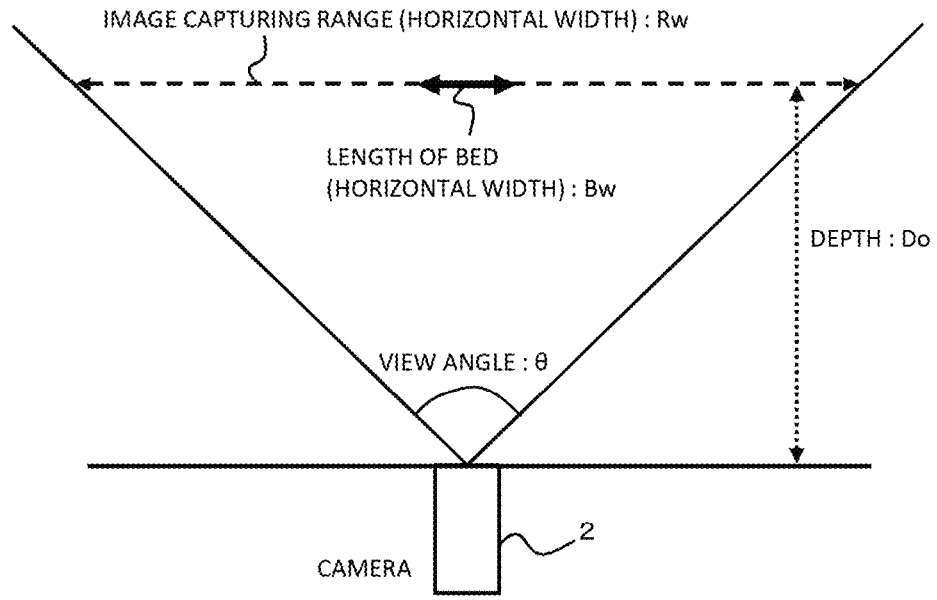
FIG. 15 is a view illustrating a relationship between a length in the real space and a length in the captured image.

FIG. 15 illustrates a correlation between the length in the real space, the length in the captured image 3 and the depth. Let Do be the depth, Rw be the image capturing range in the crosswise direction within the real space with the depth Do and Bw be the length of the object in the crosswise direction within the real space. Further, let Rp the length (pixel count) of the captured image 3 in the crosswise direction and Bp be the length (pixel count) of the object in the crosswise direction in the captured image 3. In this case, a relationship expressed by a mathematical expression 1 is established.

$$Rw:Bw=Rp:Bp \quad \text{[Mathematical Expression 1]}$$

Herein, the length (pixel count) between the head-sided two points of the bed and the length (pixel count) between the leg-sided two points of the bed, which are obtained in steps up to S203, are each substituted into Bp. Further, the value Rp represents the length (pixel count) of the captured image 3 in the crosswise direction and is a known value depending on the captured image 3 to be acquired. Moreover, let θ be a view angle of the camera 2, and Rw is given to have a relationship established by a mathematical expression 2.

$$Rw = 2 \times Do \times \tan\frac{\theta}{2} \quad \text{[Mathematical Expression 2]}$$

Herein, the view angle θ of the camera 2 is a known value depending on the camera 2. Therefore, when the length Bw of the object in the crosswise direction in the real space is given, the control unit 11 can obtain the depth Do of the target object by solving the mathematical expressions 1 and 2. Herein, as described above, each of the length between the head-sided two points of the bed and the leg-sided two points of the bed in the real space corresponds to a horizontal width of the bed and is set as a known value. Accordingly, the control unit 11 can obtain the depth at the middle point between the head-sided two points of the bed and the depth at the middle point between the leg-sided two points of the bed, respectively. Namely, the control unit 11 executes the processes of steps S201-S204. The control unit 11 is thereby enabled to calculate the depth of the target object in a way that associates the length of the target object in the captured image 3 with the length of the target object in the real space, the latter length being set as the predetermined value.

Thereafter, the control unit 11 can specify the position of the bed in the real space from the depth at the middle point between the head-sided two points of the bed and the depth at the middle point between the leg-sided two points of the bed. For instance, the control unit 11 can specify a vertical width of the bed from a difference between the depth at the middle point between the head-sided two points of the bed and the depth at the middle point between the leg-sided two points of the bed. Further, for instance, the control unit 11 can specify an area of an upper surface of the bed (precisely a mattress) in the real space from the positions of the four markers and the positions of the middle point between the head-sided two points of the bed and of the middle point between the leg-sided two points of the bed in the real space.

Note that in the processes executed so far, the positions of the middle point between the head-sided two points of the bed and of the middle point between the leg-sided two points of the bed in the real space are specified. Hence, the control unit 11 makes use of a vector connecting the middle point between the head-sided two points of the bed to the middle point between the leg-sided two points of the bed. The control unit 11 can, based on this vector, projective-transforms a 3D space (real space) expressed by setting the position of the camera 2 as the reference into a 3D space expressed by setting the position of the bed as the reference. The control unit 11 is thereby enabled to express the real space by setting the position of the bed as the reference without depending on the position of the camera 2. In the present modified example, the control unit 11 determines the behavior of the watching target person in relation to the bed. The processing of the control unit 11 can be therefore simplified by expressing the real space in a coordinate system with the bed position serving as the reference.

(5) Behavioral Presumption Using Planar Dimension

The two examples have been described as the conditions for presuming the behavior of the watching target person in the present embodiment. By way of other examples, for instance, when the watching target person conducts the behavior with respect to the target object, a range of a planar dimension of the area in which to obtain the depth of the watching target person in the predetermined region, who exists in the detection area in the real space, may be set as the condition for presuming the behavior of the watching target person.

In this case, in step S103, the control unit 11 may estimate a region area corresponding to the predetermined region of the watching target person in the field, included in the detection area, of the foreground area. The region to be estimated may be properly set corresponding to the embodiment. The region is exemplified such as the head and the shoulder. Further, a method of estimating the predetermined region may be properly set corresponding to the embodiment. A method of estimating an area of the head and an area of the shoulder will be described later on.

Herein, as illustrated in FIG. 15, as the object moves way farther from the camera 2, the image of the object in the captured image 3 gets smaller. Therefore, the control unit 11 may calculate, so as not to be affected by a far-and-near distance of the object, the planar dimension on the pixel-by-pixel basis in the real space in accordance with the depths on the pixel-by-pixel basis in the region area indicated by the depth information. To be specific, the planar dimension can be obtained as follows. To give an explanation with reference to FIG. 15, a length w of one pixel at the depth Do in the real space is expressed by the mathematical expression 3.

$$w = \frac{Rw}{Rp} \quad \text{[Mathematical Expression 3]}$$

Herein, the depth Do can be acquired from the depth information contained in the captured image 3. As described above, the length Rp of the captured image 3 in the crosswise direction and the view angle θ of the camera 2 are the known values. Hence, the control unit 11 can specify the length w of one pixel in the real space on the basis of the mathematical expressions 2 and 3. A planar dimension of one pixel in the real space is calculated by raising the length w to the second power. Therefore, the control unit 11 can calculate the planar dimension on the pixel-by-pixel basis in the real space by use of the length w of one pixel in the real space.

Then, the control unit 11 determines whether or not a total sum of the planar dimensions calculated on the pixel-by-pixel basis in the region area is contained in the range of the planar dimension set as the condition. The control unit 11 may presume, based on this determination, the behavior of the watching target person with respect to the target object. Note that the planar dimension described above largely varies depending on noises of the depth information and motions etc of physical objects other than the watching target person as the case may be. To cope with this variation, the control unit 11 may make use of an average of the planar dimensions for some number of frames. Further, the control unit 11, if a difference between an average of the planar dimensions of the relevant area for processing target frames and an average of the planar dimensions of the relevant area for some number of frames formed earlier than the processing target frames exceeds a predetermined range, may eliminate this area from the processing target areas.

(6) Behavioral Presumption Using Planar Dimension and Dispersion

If using only the planar dimension of the predetermined region area of the watching target person, however, the control unit 11 has a possibility of mis-recognizing the region of the watching target person. Such being the case, the control unit 11 may prevent the mis-recognition by making use of a dispersion representing a degree of spread of the region area in the real space.

Figure 16:
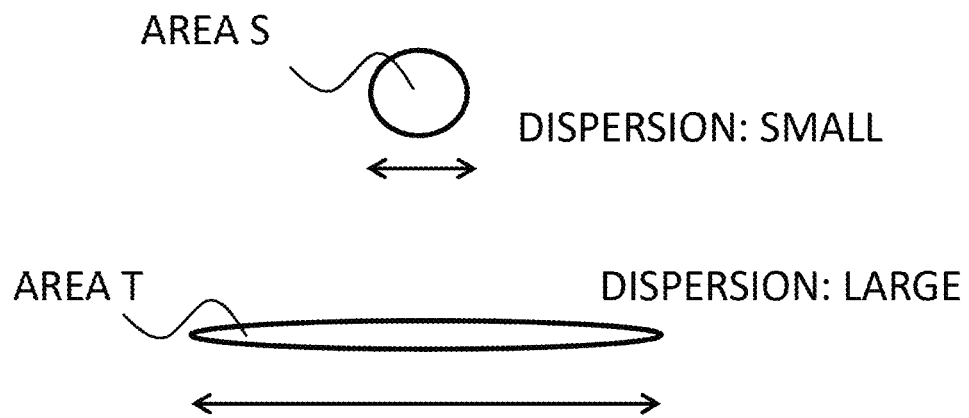
FIG. 16 is a view illustrating a relationship between a degree of spread of the area and a dispersion thereof.

Herein, the dispersion will be described with reference to FIG. 16. FIG. 16 illustrates a relationship between the degree of spread and the dispersion. It is assumed that each of an area S and an area T depicted in FIG. 16 has the same planar dimension. If the control unit 11 tries to presume the region of the watching target person by using only the planar dimension of the region area, the control unit 11 mis-recognizes that the area S is the same as the area T. The control unit 11 therefore has a possibility of mis-recognizing the region of the watching target person. As illustrated in FIG. 16, however, the area S and the area T are largely different in terms of their degrees of spreads in the real space (the degrees of spreads in the horizontal direction in FIG. 16). Then, the control unit 11 obtains the dispersions in the positions of the respective pixels within the region area, and may prevent the mis-recognition by making use of the dispersions.

To be specific, when the watching target person conducts the behavior of the watching target person with respect to the target object, a range of the dispersion indicating the degree of spread of the area in which to obtain the depth about the predetermined region of the watching target person existing in the detection area in the real space, may further be set as the condition for presuming the behavior of the watching target person. Then, in step S103, the control unit 11 calculates the dispersion indicating the degree of spread of the region area to be estimated in the real space. The control unit 11 further determines whether the range set as the condition for presuming the behavior of the watching target person includes the calculated dispersion or not. The control unit 11 may thus presume the behavior of the watching target person with respect to the target object on the basis of the further determining result.

(7) Behavioral Presumption Using Head

The embodiment discussed above has exemplified the bed as the target object becoming the reference for the behavior of the watching target person. This being the case, the detection area for determining the processing range of the behavioral presumption may be set above the bed to cover at least the head of the watching target person when the watching target person behaves on the bed. Then, the range of the planar dimension and the range of the dispersion each becoming the condition for presuming the behavior of the watching target person, may be set in a way that targets on at least the head of the watching target person.

In this case, in step S103, the control unit 11 estimates a head area corresponding to the head of the watching target person in the field, included in the detection area, of the foreground area extracted in step S102. The control unit 11 calculates a total planar dimension and a dispersion of the estimated head area. Then, the control unit 11 determines whether the calculated total planar dimension and spread of the head area are included in the ranges of the conditions set as the target ranges or not. The control unit 11 may thus presume the behavior of the watching target person in relation to the bed on the basis of the determining result.

Figure 17:
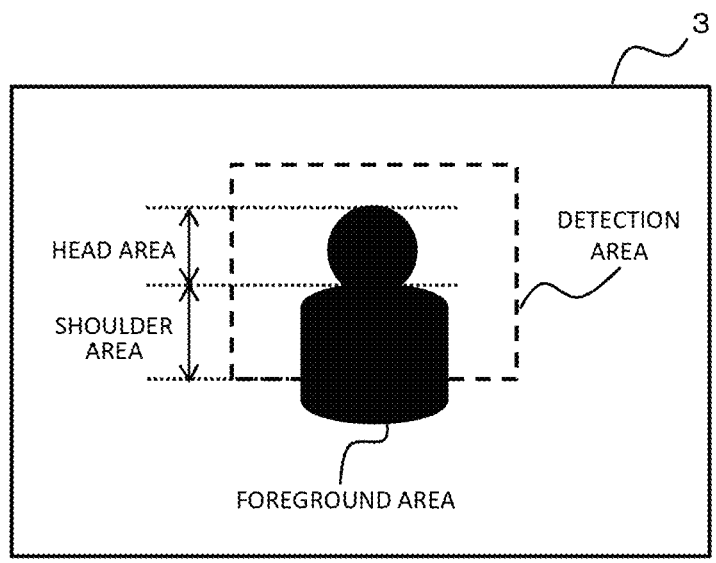
FIG. 17 is a view illustrating a relationship between a head area and a shoulder area each estimated in a field, included in the detection area, of the foreground area.

A method of estimating the head region corresponding to the head of the watching target person in the field, included in the detection area, of the foreground area may be properly set corresponding to the embodiment. The control unit 11 estimates the head area by, e.g., a method illustrated in FIG. 17. FIG. 17 illustrates a relationship between the head area estimated in the field, included in the detection area, of the foreground area and a shoulder area that will be described later on. The control unit 11 may assume the highest position of the field, included in the detection area, of the foreground area as a position of the parietal region. Then, the control unit 11 may estimate a field of the foreground area within a predetermined range extending from the highest position downward to be the head area.

(8) Behavioral Presumption Using Head and Shoulder

Herein, if using only the head area for presuming the behavior of the watching target person in relation to the bed, it follows that the control unit 11 mis-recognizes an object having the same surface shape as the head to be the real head, resulting in the mis-recognition of the behavior of the watching target person. Therefore, the range of the planar dimension and the range of the dispersion each becoming the condition for presuming the behavior of the watching target person may further be set in a way that targets on the shoulder of the watching target person.

In this case, step S103, the control unit 11 further estimates a shoulder area corresponding to the shoulder of the watching target person from an area adjacent to the head area in the field, included in the detection area, of the foreground area extracted in step S102. The control unit 11 calculates a total planar dimension and a dispersion of the estimated shoulder area. Then, the control unit 11 further determines whether the calculated total planar dimension and spread of the shoulder area are included in the ranges of the conditions set as the target ranges or not. The control unit 11 may thus presume the behavior of the watching target person in relation to the bed on the basis of the further determining result.

A method of estimating the shoulder region corresponding to the shoulder of the watching target person in the field, included in the detection area, of the foreground area may be properly set corresponding to the embodiment. The control unit 11 estimates the shoulder area subsequent to the head area by, e.g., the method illustrated in FIG. 17. Specifically, the control unit 11 may estimate, to be the shoulder area, a field of the foreground area within a range of a predetermined area extending from a lower edge of the head area downward in an area continuous from the head area. The shoulder area is an area likely to have a wider spread than the head area. It is therefore feasible to enhance the accuracy of presuming the behavior of the watching target person by adequately reflecting states of spreading degrees of the head area and the shoulder area in the conditions described above.

Note that the concrete examples of the behaviors of the watching target person in relation to the bed can be exemplified by the get-up state on the bed, the sitting-on-bed-edge state, the body-moving-over state from the bed (over-bed-fence state), the come-down state from the bed and the leaving-bed state from the bed of the watching target person. The control unit 11 may set at least any one of these behaviors (states) as the presumption target.

Herein, the control unit 11, when setting only any one of these behaviors as the presumption target, may presume the behavior of the watching target person on the basis of a condition that at least any one of the head area and the shoulder area appears in the detection area.

On the other hand, the control unit 11, when setting plural behaviors of these behaviors as the presumption targets, may presume the respective behaviors on the basis of a positional relationship between the head area, the shoulder area and the bed in the real space. At this time, the control unit 11 may obtain an average position of the head area and an average position of the shoulder area in the real space by using the positions and the depths of the respective pixels contained in the head area and the shoulder area in the captured image 3. Then, the control unit 11 may presume the get-up state of the watching target person when the average positions of the head area and the shoulder area can be estimated to exist in the vicinity of the center of the bed, respectively.

On other hand, the sitting-on-bed-edge state, the body-moving-overstate from the bed (over-bed-fence state), the come-down state from the bed and the leaving-bed state from the bed are defined as the behaviors in the periphery of the side frames of the bed. These behaviors can be distinguished from each other on the basis of the positional relationship between the head area and the shoulder area. For example, the position of the head area becomes lower in the sequence such as the leaving-bed state, the sitting-on-bed-edge state, the body-moving-over state (over-bed-fence state) and the come-down state. The control unit 11 may distinguish, based on these relationships, the leaving-bed state, the sitting-on-bed-edge state, the body-moving-over state (over-bed-fence state) and the come-down state from each other.

Figure 18:
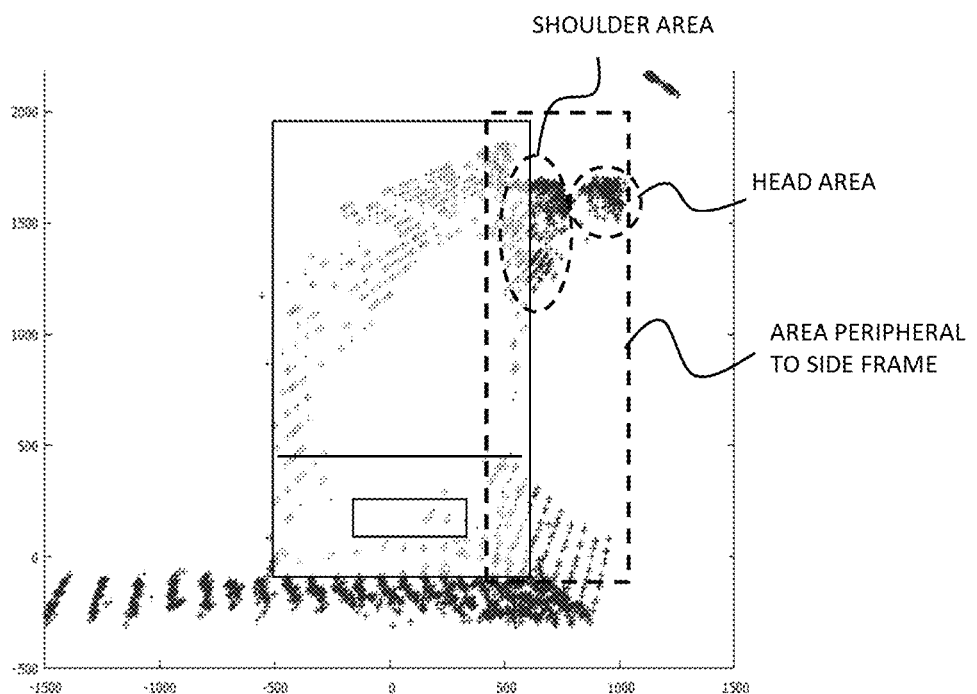
FIG. 18 is a view illustrating the foreground area when the watching target person behaves at an edge of the bed.

Note that the control unit 11 can determine an inclination of the body of the watching target person from the positional relationship between the head area and the shoulder area. This point will be described with reference to FIG. 18. FIG. 18 depicts a state of the foreground area in the real space as viewed just from above, the foreground area appearing when the watching target person sits on the edge of the bed. In the state depicted in FIG. 18, the head area protrudes more outward of the bed than the shoulder area. The body of the watching target person is therefore assumed to be inclined outward of the bed. The control unit 11 may determine the inclination of the body of the watching target person from the above-mentioned positional relationship between the head area and the shoulder area. Then, the control unit 11 may presume the behavior of the watching target person by further taking the inclination of the body into consideration. For example, if the average position of the head area exists inward of the bed and if the average position of the shoulder area exists outward of the bed, the control unit 11 can recognize that a person (e.g., the watcher who watches the behavior of the watching target person) other than the watching target person conducts a behavior of peeping at the watching target person from outward of the bed.

(9) Modification of Detection Area

The watching target person moves away from the target object serving as the reference for the behavior in some cases. For example, the watching target person, when conducting any one of the behaviors (states) such as the sitting-on-bed-edge state, the body-moving-over state (over-bed-fence state), the come-down state from the bed and the leaving-bed state from the bed, moves away from the bed (target object) in some cases.

In this connection, the detection area is the area assumed to exist when the watching target person conducts the relevant behavior and is set based on the target object serving as the reference for the behavior as the case may be. For instance, as illustrated in FIG. 10, there is a case of setting the detection area above the bed. In this case, when the watching target person performs the behavior of moving away from the target object, there is a possibility of moving outside the detection area.

Then, the control unit 11, when presuming the behavior of moving away from the target object such as this, may modify the range of the detection area by setting the position of the foreground area used for presuming the behavior as the reference. For example, the control unit 11 presumes any one of the behaviors (states) such as the sitting-on-bed-edge state, the body-moving-over state from the bed, the come-down state from the bed and the leaving-bed state from the bed of the watching target person. Then, the control unit 11 further presumes the behavior of the watching target person by use of the captured image 3 acquired thereafter. In this case, the control unit 11 may change the range of the detection area to become an area of the range estimated to cover the existences of the head and the shoulder of the watching target person, in which the positions of the head area and the shoulder area when presuming any one of the behaviors of the watching target person are set as the references.

Note that the method of setting the detection area may be properly set corresponding to the embodiment. For instance, the control unit 11 may set the middle point of the average position of each of the head area and the shoulder area when presuming any one of the behaviors of the watching target person as the center of a new detection area. Then, the control unit 11 may set the range of the new detection area, corresponding to the presumed behavior. For example, the control unit 11 may also set the new detection area in a range that differs in the case of presuming the leaving-bed state of the watching target person and in the case of presuming the come-down state of the watching target person.

(10) Display of Captured Image

As described above, the control unit 11 functions as the display control unit 26. As illustrated in FIG. 2 etc., the captured image 3 may be displayed on the display device, the captured image 3 being formed so that the grayscale values (pixel values) of the pixels in the captured image 3 are determined corresponding to the depths of the pixels. The captured image 3 formed so that the grayscale values of the pixels are determined corresponding to the depths of the pixels is, as illustrated in FIG. 2 etc., image that is hard for the user to recognize the object in the captured image 3. Such being the case, as illustrated in FIG. 11, the control unit 11 differentiates the areas identified as the specified areas within the captured image 3 by colors. The control unit 11 displays the captured image 3 (the color-differentiated areas) on the display device and thus may get the specified areas easy for the user to grasp.

Figure 19:
FIG. 19 is a view illustrating the captured image displayed by color-differentiating specified areas.

FIG. 19 illustrates an example of the captured image 3 displayed so that the specified areas are color-differentiated. The head area and the shoulder area of the watching target person and the area of the target object (bed) are color-differentiated and thus displayed on the screen depicted in FIG. 19. The control unit 11 allocates the colors to these areas to make the user easy to distinguish the areas. For example, the control unit 11 displays the head area in red, the shoulder area in yellow and the area of the bed in blue. The colors allocated to the respective areas may be preset and may also be set by the user.

According to one aspect, the present embodiment aims at providing the technology enabling the presumption of the behaviors suited to the states of the watching target person in the real space. Then, as discussed above, according to the present embodiment, it is feasible to provide the technology enabling the presumption of the behaviors suited to the states of the watching target person in the real space.

The invention claimed is:

1. An information processing apparatus comprising:
an image acquiring computer configured to acquire captured image given by capturing an image of a watching target person whose behavior is watched and an image of a target object serving as a reference for a behavior of the watching target person, the captured image containing depth information indicating depths obtained on a pixel-by-pixel basis within the captured image;
a foreground area extracting computer configured to extract a foreground area of the captured image on the basis of a difference between a foreground image and the captured image, the foreground image being set to contain a depth of the foreground as the foreground of the captured image; and
a behavior presuming computer configured to determine a positional relationship between the foreground area and the area of the target object in a real space by determining relative position of the foreground area with respect to the target object and presume the behavior of the watching target person with respect to the target object by determining whether the positional relationship satisfies a predetermined condition or not on the basis of referring to the depths of the pixels within the foreground area on the basis of the depth information, the predetermined condition being set on the assumption that the extracted foreground area is related to the behavior of the watching target person,
wherein when the watching target person conducts the behavior with respect to the target object, a range of a planar dimension of an area in which to obtain the depth of a predetermined region of the watching target person existing in the detection area in the real space, is set as the condition for presuming the behavior of the watching target person, the detection area set for the target object, and
the behavior presuming computer is configured to:
estimate a region area corresponding to the predetermined region of the watching target person in the field, included in the detection area, of the foreground area,
calculate planar dimensions on a pixel-by-pixel basis in the real space in accordance with depths on the pixel-by-pixel basis in the region area indicated by the depth information, and
presume the behavior of the watching target person with respect to the target object on the basis of determining whether a total sum of the planar dimensions calculated on the pixel-by-pixel basis in the region area is included in the planar dimension range set as the condition or not.

2. The information processing apparatus according to claim 1, further comprising a detection area setting computer configured:
to accept designation of an area covering an existence of the target object within the captured image,
to acquire the depth of the target object existing in the designated area from the captured image,
to specify a position of the target object in the real space on the basis of the acquired depth of the target object and
to set the detection area corresponding to the specified position of the target object in the real space.

3. The information processing apparatus according to claim 2, wherein the detection area setting computer is configured to:
associate a length of the target object in the captured image with a length of the target object in the real space, the latter length being set as a predetermined value,
calculate the depth of the target object and
acquire the depth of the target object from the captured image without referring to the depth information contained in the captured image.

4. The information processing apparatus according to claim 1, wherein when the watching target person conducts the behavior with respect to the target object, a range of a dispersion indicating a spread degree of the area in which to obtain the depth with respect to the predetermined region of the watching target person existing in the detection area in the real space, is further set as the condition for presuming the behavior of the watching target person, and
the behavior presuming computer is configured to:
calculate the dispersion indicating the spread degree of the region area to be estimated in the real space, and
presume the behavior of the watching target person with respect to the target object on the basis of further determining whether the calculated dispersion is included in the range set as the condition or not.

5. The information processing apparatus according to claim 4, wherein the target object is a bed,
the detection area is set above the bed to include at least a head of the watching target person when the watching target person behaves on the bed,
the range of the planar dimension and the range of the dispersion each becoming the condition for presuming the behavior of the watching target person are set in a way that targets on at least the head of the watching target person, and
the behavior presuming computer is configured to:
estimate a head area corresponding to the head of the watching target person in the field, included in the detection area, of the foreground area,
calculate a total sum of planar dimensions and a dispersion about the estimated head area, and
presume the behavior of the watching target person with respect to the bed on the basis of determining whether or not the calculated total sum of the planar dimensions and the calculated dispersion about the head area are included in the ranges each set in a way that targets on the head.

6. The information processing apparatus according to claim 5, wherein the range of the planar dimension and the range of the dispersion, each becoming the condition for presuming the behavior of the watching target person, are further set in a way that targets on a shoulder of the watching target person, and the behavior presuming computer is configured to:
further estimate a shoulder area corresponding to the shoulder of the watching target person from an area adjacent to the head area in the field, included in the detection area, of the foreground area,
calculate the total sum of the planar dimensions and the dispersion about the estimated shoulder area, and
presume the behavior of the watching target person with respect to the bed on the basis of further determining whether or not the calculated total sum of the planar dimensions and the calculated dispersion about the shoulder area are included in the ranges each set in a way that targets on the shoulder.

7. The information processing apparatus according to claim 6, wherein the behavior presuming computer is configured to presume, as the behavior of the watching target person, at least any one of a get-up state on the bed, a sitting-on-bed-edge state, a body-moving-over-fence state from the bed, a come-down state from the bed and a leaving-bed state from the bed of the watching target person, the presumption being made based on a positional relationship between the head area, the shoulder area and the bed in the real space.

8. The information processing apparatus according to claim 7, wherein the behavior presuming computer is configured to, when presuming the behavior of the watching target person by use of the captured image acquired after presuming at least any one of the get-up state on the bed, the sitting-on-bed-edge state, the body-moving-over-fence state from the bed, the come-down state from the bed and the leaving-bed state from the bed of the watching target person, change the range of the detection area so as to become an area estimated to cover existences of the head and the shoulder of the watching target person, with positions of the head area and the shoulder area serving as references, these positions being given when presuming any one of the get-up state on the bed, the sitting-on-bed-edge state, the body-moving-over-fence state from the bed, the come-down state from the bed and the leaving-bed state from the bed of the watching target person.

9. The information processing apparatus according to claim 5, wherein a depth sensor to measure the depth on the basis of irradiation of infrared-rays acquires the depth information contained in the captured image given by capturing the image of the watching target person and the image of the bed.

10. The information processing apparatus according to claim 1, further comprising a display controller configured to display the captured image on a display device, the captured image being formed so that grayscale values of the pixels in the captured image are determined corresponding to the depths of the pixels,
wherein the display controller is configured to display the captured image on the display device by color-differentiating the areas distinguished to be specified areas within the captured image.

11. The information processing apparatus according to claim 1, further comprising a notifying computer configured to notify, when the presumed behavior of the watching target person is a behavior indicating a symptom that the watching target person will encounter with an impending danger, a watcher to watch the watching target person of said symptom.

12. An information processing method by which a computer executes:
acquiring captured image given by capturing an image of a watching target person whose behavior is watched and an image of a target object serving as a reference for a behavior of the watching target person, the captured image containing depth information indicating depths obtained on a pixel-by-pixel basis within the captured image;
extracting a foreground area of the captured image on the basis of a difference between a foreground image and the captured image, the foreground image being set to contain a depth of the foreground as the foreground of the captured image;
determining a positional relationship between the foreground area and the area of the target object in a real space by determining relative position of the foreground area with respect to the target object; and
presuming the behavior of the watching target person with respect to the target object by determining whether the positional relationship satisfies a predetermined condition or not on the basis of referring to the depths of the pixels within the foreground area on the basis of the depth information, the predetermined condition being set on the assumption that the extracted foreground area is related to the behavior of the watching target person,
wherein when the watching target person conducts the behavior with respect to the target object, a range of a planar dimension of an area in which to obtain the depth of a predetermined region of the watching target person existing in the detection area in the real space, is set as the condition for presuming the behavior of the watching target person, the detection area set for the target object, and
in the presuming the behavior of the watching target person, the computer executes:
estimating a region area corresponding to the predetermined region of the watching target person in the field, included in the detection area, of the foreground area,
calculating planar dimensions on a pixel-by-pixel basis in the real space in accordance with depths on the pixel-by-pixel basis in the region area indicated by the depth information, and
presuming the behavior of the watching target person with respect to the target object on the basis of determining whether a total sum of the planar dimensions calculated on the pixel-by-pixel basis in the region area is included in the planar dimension range set as the condition or not.

13. A non-transitory recording medium recording a program to make a computer execute:
acquiring captured image given by capturing an image of a watching target person whose behavior is watched and an image of a target object serving as a reference for a behavior of the watching target person, the captured image containing depth information indicating depths obtained on a pixel-by-pixel basis within the captured image;
extracting a foreground area of the captured image on the basis of a difference between a foreground image and the captured image, the foreground image being set to contain a depth of the foreground as the foreground of the captured image;
determining a positional relationship between the foreground area and the area of the target object in a real space by determining relative position of the foreground area with respect to the target object; and
presuming the behavior of the watching target person with respect to the target object by determining whether the positional relationship satisfies a predetermined condition or not on the basis of referring to the depths of the pixels within the foreground area on the basis of the depth information, the predetermined condition being set on the assumption that the extracted foreground area is related to the behavior of the watching target person, wherein when the watching target person conducts the behavior with respect to the target object, a range of a planar dimension of an area in which to obtain the depth of a predetermined region of the watching target person existing in the detection area in the real space, is set as the condition for presuming the behavior of the watching target person, the detection area set for the target object, and in the presuming the behavior of the watching target person, the computer executes:
- estimating a region area corresponding to the predetermined region of the watching target person in the field, included in the detection area, of the foreground area,
- calculating planar dimensions on a pixel-by-pixel basis in the real space in accordance with depths on the pixel-by-pixel basis in the region area indicated by the depth information, and
- presuming the behavior of the watching target person with respect to the target object on the basis of determining whether a total sum of the planar dimensions calculated on the pixel-by-pixel basis in the region area is included in the planar dimension range set as the condition or not.

* * * * *